(12) United States Patent
Wei et al.

(10) Patent No.: US 9,171,540 B2
(45) Date of Patent: Oct. 27, 2015

(54) METHOD, APPARATUS, AND ACCESS NETWORK SYSTEM FOR SPEECH SIGNAL PROCESSING

(71) Applicant: HUAWEI TECHNOLOGIES CO., LTD., Shenzhen (CN)

(72) Inventors: Yuejun Wei, Moscow (RU); Xin Tang, Shanghai (CN); Qian Zhu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 101 days.

(21) Appl. No.: 14/092,319

(22) Filed: Nov. 27, 2013

(65) Prior Publication Data

US 2014/0089770 A1    Mar. 27, 2014

Related U.S. Application Data

(63) Continuation of application No. PCT/CN2012/070658, filed on Jan. 20, 2012.

(30) Foreign Application Priority Data

May 27, 2011    (CN) .................. PCT/CN2011/074801

(51) Int. Cl.
*G06F 11/10* (2006.01)
*H03M 13/00* (2006.01)
(Continued)

(52) U.S. Cl.
CPC ............ *G10L 15/14* (2013.01); *G06F 11/1004* (2013.01); *H04L 1/007* (2013.01); *H04L 1/0054* (2013.01); *H04L 1/0059* (2013.01); *H04L 1/0061* (2013.01); *H04L 1/0065* (2013.01)

(58) Field of Classification Search
CPC ....... G10L 15/14; H04L 1/0061; H04L 1/007; H04L 1/0054; H04L 1/0059; H04L 1/0065; G06F 11/1004
See application file for complete search history.

(56) References Cited

U.S. PATENT DOCUMENTS 5,710,784 A *    1/1998    Kindred et al. ............... 375/262
6,061,823 A    5/2000    Nara
(Continued)

FOREIGN PATENT DOCUMENTS

CN    1221169 A    6/1999
CN    1360796 A    7/2002
(Continued)

OTHER PUBLICATIONS

Hai et al., "Burst Error Smoothing by Using the Outer Loop Power Control in DS-CDMA systems" The 6th International Conference on Feb. 11, 2004, vol. 1, 2004, pp. 38-41.
(Continued)

*Primary Examiner* — Sam Rizk
(74) *Attorney, Agent, or Firm* — Brinks Gilson & Lione

(57) ABSTRACT

A method and an apparatus for speech signal processing are provided. The method includes: receiving an encoded speech signal sent by a user equipment, where the encoded speech signal includes a first substream, a second substream, and a third substream, and the first substream is attached with a cyclic redundancy check (CRC); performing decoding processing on the first substream, the second substream, and the third substream by adopting a decoding algorithm, where a decoding algorithm that is based on an auxiliary decision of the CRC is adopted to perform decoding processing on the first substream; and sending decoding results of the first substream, the second substream, and the third substream to a base station controller, where the decoding result of the first substream includes a decoded bit stream and a CRC result. Decoding performance of the first substream is improved, and users' higher requirements for the speech quality are met.

13 Claims, 12 Drawing Sheets

(51) Int. Cl.
  *G10L 15/14* (2006.01)
  *H04L 1/00* (2006.01)

(56) References Cited

U.S. PATENT DOCUMENTS

| | | | |
|---|---|---|---|
| 6,108,386 | A | 8/2000 | Chen et al. |
| 6,161,210 | A | 12/2000 | Chen et al. |
| 6,230,124 | B1 | 5/2001 | Maeda |
| 6,272,660 | B1 | 8/2001 | Chen et al. |
| 6,868,257 | B1 | 3/2005 | Holma |
| 7,203,637 | B1 | 4/2007 | Galyas |
| 2001/0036236 | A1 | 11/2001 | Kobayashi et al. |
| 2002/0006138 | A1 | 1/2002 | Odenwalder |
| 2004/0168113 | A1 | 8/2004 | Murata et al. |
| 2006/0050666 | A1* | 3/2006 | Odenwalder ............... 370/335 |
| 2006/0050771 | A1 | 3/2006 | Shinozaki |
| 2006/0259297 | A1 | 11/2006 | Heiman et al. |
| 2007/0156402 | A1* | 7/2007 | Heiman ............... 704/242 |
| 2008/0028274 | A1 | 1/2008 | Lin |
| 2008/0139235 | A1 | 6/2008 | Tidestav et al. |
| 2008/0146162 | A1 | 6/2008 | Omori et al. |
| 2008/0316934 | A1 | 12/2008 | Nibe |
| 2009/0177465 | A1 | 7/2009 | Johansson et al. |
| 2009/0276221 | A1 | 11/2009 | Heiman et al. |
| 2010/0058152 | A1 | 3/2010 | Harada |
| 2010/0153103 | A1 | 6/2010 | Heiman |

FOREIGN PATENT DOCUMENTS

| | | | |
|---|---|---|---|
| CN | 1428953 | A | 7/2003 |
| CN | 1483257 | A | 3/2004 |
| CN | 101155141 | A | 4/2008 |
| CN | 101336450 | A | 12/2008 |
| EP | 0930738 | A2 | 7/1999 |
| EP | 1638219 | A2 | 3/2006 |
| JP | 10-303759 | A | 11/1998 |
| JP | 11-134819 | A | 5/1999 |
| JP | 2003-503979 | A | 1/2003 |
| JP | 2006-505172 | A | 2/2006 |
| JP | 2006-80924 | A | 3/2006 |
| JP | 2008-154003 | A | 7/2008 |
| JP | 2009-5216 | A | 1/2009 |
| JP | 2009017587 | A | 1/2009 |
| WO | WO 01/03448 | A2 | 1/2001 |
| WO | WO 03/021905 | A1 | 3/2003 |
| WO | WO 2004/040771 | A1 | 5/2004 |
| WO | WO 2011/144112 | A2 | 11/2011 |

OTHER PUBLICATIONS

Heikkilä et al., SLVA Decoding with Unequal Error Protection MILCOM 2004, 2004 IEEE Military Communications Conference, 5 pages.

Leanderson et al., "The Max-Log List Algorithm (MLLA)—A List-Sequence Decoding Algorithm That Provides Soft-Symbol Output" IEEE Transactions on Communications, vol. 53, No. 3, Mar. 2005, 12 pages.

Röoder et al., "Fast List Viterbi Decoding and Application for Source-Channel Coding of Images" ICME IEEE 2002, 4 pages.

Seshadri et al., "List Viterbi Decoding Algorithms with Applications" IEEE Transactions on Communications, vol. 42, No. 2/3/4, Feb./Mar./Apr. 1994, 11 pages.

Wang et al., "CRC-Assisted Error Correction in a Convolutionally Coded System" IEEE Transactions on Communications, vol. 56, No. 11, Nov. 2008, 9 pages.

3$^{rd}$ Generation Partnership Project, "Technical Specification Group Radio Access Networks; Deployment aspects" 3GPP TR 25.943, V9.0.0, Dec. 2009, 13 pages.

LTE, "3$^{rd}$ Generation Partnership Project; Technical Specification Group Services and System Aspects; Mandatory Speech Codec speech processing functions; Adaptive Multi-Rate (AMR) speech codec; Transcoding functions" (Release 9) 3GPP TS 26.090, V9.0.0 Dec. 2009, 55 pages.

LTE, "3$^{rd}$ Generation Partnership Project; Technical Specification Group Services and System Aspects; ANSI-C code for the Adaptive Multi Rate (AMR) speech codec" (Release 9) 3GPP TS 26.073, V9.0.0, Dec. 2009, 25 pages.

3rd Generation Partnership Project, "Technical Specification Group Radio Access Network; Physical channels and mapping of transport channels onto physical channels (FDD)" (Release 9) 3GPP TS 25.211, V9.2.0, Sep. 2010, 58 pages.

3rd Generation Partnership Project, "Technical Specification Group Radio Access Network; Spreading and modulation (FDD)" (Release 9) 3GPP TS 25.213, V9.2.0, Sep. 2010, 38 pages.

3rd Generation Partnership Project, "Technical Specification Group Radio Access Network; Multiplexing and channel coding (FDD)" (Release 9) 3GPP TS 25.212, V9.4.0, Dec. 2010, 108 pages.

3rd Generation Partnership Project, "Technical Specification Group Radio Access Network; Physical layer procedures (FDD)" (Release 9) 3GPP TS 25.214, V9.5.0, Mar. 2011, 99 pages.

* cited by examiner

METHOD, APPARATUS, AND ACCESS NETWORK SYSTEM FOR SPEECH SIGNAL PROCESSING

CROSS-REFERENCE TO RELATED APPLICATIONS

This application is a continuation of International Application No. PCT/CN2012/070658, filed on Jan. 20, 2012, which claims priority to International Application No. PCT/CN2011/074801, filed on May 27, 2011, both of which are hereby incorporated by reference in their entireties.

FIELD OF THE INVENTION

The embodiments of the present invention relate to the field of communications, and in particular, to a method, an apparatus and an access network system for speech signal processing.

BACKGROUND OF THE INVENTION

In an existing communications system, for example, in a universal mobile telecommunications system (hereinafter referred to as UMTS), speech encoding adopts a large amount of convolutional codes as channel encoding and utilizes a power control mechanism to guarantee its speech quality. FIG. 1 is a schematic diagram of a system architecture of a speech encoding process in the prior art. As shown in FIG. 1, taking a UMTS network as an example, a processing process of an uplink adaptive muti-rate (hereinafter referred to as AMR) speech signal is that, speech encoding of an AMR speech encoder (hereinafter referred to as AMR Speech Encoder) in a user equipment (hereinafter referred to as UE) adopts convolutional codes through a convolutional code encoder (hereinafter referred to as CC Encoder) to perform encoding processing, and AMR speech signals after the encoding of the CC Encoder are sent to a base station (hereinafter referred to as NodeB) through an air interface; a CC decoder (hereinafter referred to as CC Decoder) in the NodeB can decode the AMR speech signals, and the CC Decoder includes two outputs. In one output, a decoded bit stream is sent to a radio network controller (hereinafter referred to as RNC) through an Iub interface, and then is sent by the RNC to an AMR speech decoder (hereinafter referred to as AMR Speech Decoder) in a core network (hereinafter referred to as CN) through an Iu interface. In the other input, a cyclic redundancy check (hereinafter referred to as CRC) result, that is, a CRC indicator (hereinafter referred to as CRCI), is sent to the RNC through the Tub interface, and the RNC then can send a bad frame indicator (hereinafter referred to as BFI) to the AMR Speech Decoder in the CN through the Iu interface according to the CRCI. The CC Decoder also sends the CRCI to an outer-loop power control module (hereinafter referred to as Outer-Loop Power Control) in the RNC. After receiving the decoded bit stream and the BFI, the AMR Speech Decoder can perform decoding processing; while the Outer-Loop Power Control may adjust a target block error ratio (hereinafter referred to as BLER) according to the CRCI, and send a target signal-to-interference-plus-noise ratio (hereinafter referred to as Target SINR) to an inner-loop power control module (hereinafter referred to as Inner-Loop Power Control) in the NodeB according to an adjusted BLER. The Inner-Loop Power Control sends a power command (hereinafter referred to as Power Command) to a power transmitter (hereinafter referred to as Power Transmitter) of the UE, according to a measured signal-to-interference-plus-noise ratio (hereinafter referred to as Measured SINR) and the Target SINR, to adjust transmission power of the UE. FIG. 2 is a schematic structural diagram of processing three substreams in the system architecture which is shown in FIG. 1. As shown in FIG. 2, in the prior art, the AMR speech signal may be classified into three substreams, A, B, and C, that is, Class A signal, Class B signal, and Class C signal. Substream A has the strongest influence on the speech quality and is also the most important, after whose data block, a 12-bit CRC is attached. Substreams B and C are relatively less important and the data block is followed with no CRC. The CC Decoder in the NodeB adopts a Viterbi algorithm (hereinafter referred to as VA) decoder, while in a decoding result of the VA decoder, only substream A has the CRCI.

However, during an implementation process of the present invention, the inventor finds that in the prior art the NodeB has a relatively low decoding performance for convolutional codes of substream A of the uplink AMR speech signal, or a UE has a relatively low decoding performance for convolutional codes of substream A of a downlink AMR speech signal, which has a relatively strong influence on the speech quality and fails to meet users' higher requirements for the speech quality.

SUMMARY OF THE INVENTION

The embodiments of the present invention provide a method, an apparatus, and an access network system for speech signal processing, so as to improve decoding performance for convolutional codes of substream A.

An embodiment of the present invention provides a speech signal processing method, including:
  receiving an encoded speech signal sent by a user equipment (UE), where the encoded speech signal includes a first substream, a second substream, and a third substream, and the first substream includes a cyclic redundancy check (CRC);
  performing decoding processing on the first substream, the second substream, and the third substream by adopting a decoding algorithm, where a decoding algorithm that is based on an auxiliary decision of the CRC is adopted to perform decoding processing on the first substream; and
  sending decoding results of the first substream, the second substream, and the third substream to a base station controller, where the decoding result of the first substream includes a decoded bit stream and a CRC result.

An embodiment of the present invention provides another speech signal processing method, including:
  receiving decoding results which are of a first substream, a second substream, and a third substream, and are sent by a base station, where the decoding result of the first substream is a decoding result acquired after decoding processing is performed by adopting a decoding algorithm that is based on an auxiliary decision of a cyclic redundancy check (CRC), and the decoding result includes a decoded bit stream and a CRC result; and
  sending the CRC result to an outer-loop power control module, and sending the decoded bit stream and the CRC result that are of the first substream, and the decoding results of the second substream and the third substream to a core network.

An embodiment of the present invention provides a base station, including:
  a first receiving module, configured to receive an encoded speech signal sent by a user equipment (UE), where the encoded speech signal includes a first substream, a second substream, and a third substream, and the first substream includes a cyclic redundancy check (CRC);
a decoding processing module, configured to perform decoding processing on the first substream, the second substream, and the third substream by adopting a decoding algorithm, where a decoding algorithm that is based on an auxiliary decision of the CRC is adopted to perform decoding processing on the first substream; and
a first sending module, configured to send decoding results of the first substream, the second substream, and the third substream to a base station controller, where the decoding result of the first substream includes a decoded bit stream and a CRC result.

An embodiment of the present invention provides a base station controller, including:
a second receiving module, configured to receive decoding results which are of a first substream, a second substream, and a third substream, and are sent by a base station, where the decoding result of the first substream is a decoding result acquired after decoding processing is performed by adopting a decoding algorithm that is based on an auxiliary decision of a cyclic redundancy check (CRC), and the decoding result includes a decoded bit stream and a CRC result; and
a second sending module, configured to send the CRC result to an outer-loop power control module, and send the decoded bit stream and the CRC result that are of the first substream, and the decoding results of the second substream and the third substream to a core network.

An embodiment of the present invention provides an access network system, which includes a base station and a base station controller, where the base station adopts the foregoing base station, and the base station controller adopts the foregoing base station controller.

An embodiment of the present invention provides a speech signal processing method, which includes:
receiving an encoded speech signal sent by a base station, wherein the encoded speech signal includes a first substream, a second substream, and a third substream, and the first substream includes a cyclic redundancy check CRC;
performing decoding processing on the first substream, the second substream, and the third substream by adopting a decoding algorithm to acquire decoding results of the first substream, the second substream, and the third substream, wherein a decoding algorithm that is based on an auxiliary decision of the CRC is adopted to perform decoding processing on the first substream and a decoded result of the first substream includes a decoded bit stream and a CRC result; and
performing decoding processing on an AMR speech signal according to the decoded bit stream and the CRC result of the first substream, decoded results of the second substream and the third substream.

An embodiment of the present invention provides a user equipment, which includes:
a receiving module, configured to receive an encoded speech signal sent by a base station, wherein the encoded speech signal includes a first substream, a second substream, and a third substream, and the first substream includes a cyclic redundancy check CRC;
a first decoding processing module, configured to perform decoding processing on the first substream, the second substream, and the third substream by adopting a decoding algorithm to acquire decoding results of the first substream, the second substream, and the third substream, wherein a decoding algorithm that is based on an auxiliary decision of the CRC is adopted to perform decoding processing on the first substream and a decoded result of the first substream includes decoded bit stream and a CRC result; and
a second decoding processing module, configured to perform decoding processing on an AMR speech signal according to the decoded bit stream and the CRC result of the first substream, decoded results of the second substream and the third substream.

In the embodiments of the present invention, the base station can adopt the decoding algorithm that is based on the CRC auxiliary decision to perform decoding processing on the first substream, and compared with the decoding processing which is performed by adopting a common VA decoding algorithm in the prior art, the decoding performance of the first substream can be improved. Because the first substream is relatively important for the speech quality, the embodiments of the present invention can improve the speech quality through improving the decoding performance of the first substream, and meets users' higher requirements for the speech quality.

In the embodiments of the present invention, the UE can adopt the decoding algorithm that is based on the CRC auxiliary decision to perform decoding processing on the first substream, and compared with the decoding processing which is performed by adopting a common VA decoding algorithm in the prior art, the decoding performance of the first substream can be improved. Because the first substream is relatively important for the speech quality, the embodiments of the present invention can improve the speech quality through improving the decoding performance of the first substream, and meets users' higher requirements for the speech quality.

BRIEF DESCRIPTION OF THE DRAWING

To illustrate the technical solutions in the embodiments of the present invention or in the prior art more clearly, the accompanying drawings required for describing the embodiments or the prior art are introduced briefly in the following. Apparently, the accompanying drawings in the following description are only some embodiments of the present invention, and persons of ordinary skill in the art can further derive other drawings according to these accompanying drawings without creative efforts.

DETAILED DESCRIPTION OF THE EMBODIMENTS

In order to make the objectives, the technical solutions, and the advantages of the embodiments of the present invention clearer, the technical solutions in the embodiments of the present invention are clearly and completely described in the following with reference to the accompanying drawings in the embodiments of the present invention. Apparently, the embodiments to be described are merely a part of the embodiments of the present invention rather than all of the embodiments of the present invention. All other embodiments obtained by persons of ordinary skill in the art based on the embodiments of the present invention without creative efforts all fall within the protection scope of the present invention.

The technical solutions of the present invention can be applied to various communication systems, such as a Global System for Mobile Communications (hereinafter referred to as GSM), a Code Division Multiple Access (hereinafter referred to as CDMA) 2000 system, a Wideband Code Division Multiple Access (hereinafter referred to as WCDMA) system, and a Long Term Evolution (hereinafter referred to as LTE) system. For convenience of description, the WCDMA is taken as an example in the following embodiments for illustration.

A base station may be a base station (Base Transceiver Station, hereinafter referred to as BTS) in the GSM or CDMA2000, may also be a base station (NodeB) in the WCDMA, and may also be an evolved NodeB (hereinafter referred to as eNB or eNodeB) in the LTE, which is not limited in the present invention, but for ease of illustration, the NodeB is taken as an example for illustration in the following embodiments.

A base station controller may be a base station controller (hereinafter referred to as BSC) in the GSM or CDMA2000, and may also be an RNC in the WCDMA, which is not limited in the present invention, but for ease of illustration, the RNC is taken as an example for illustration in the following embodiments.

Figure 1:
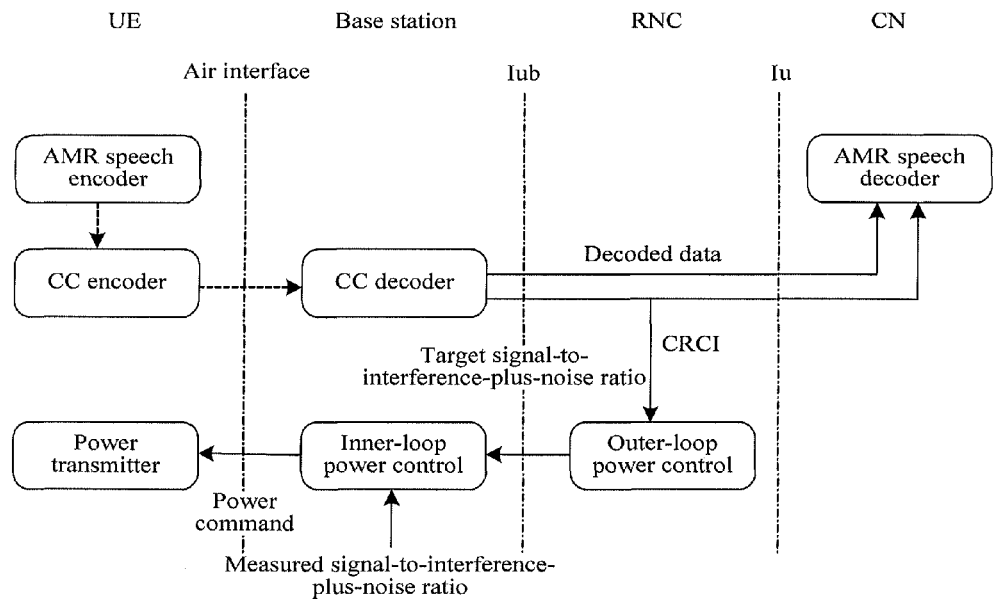
FIG. 1 is a schematic diagram of a system architecture of a speech encoding process in the prior art.
Figure 3:
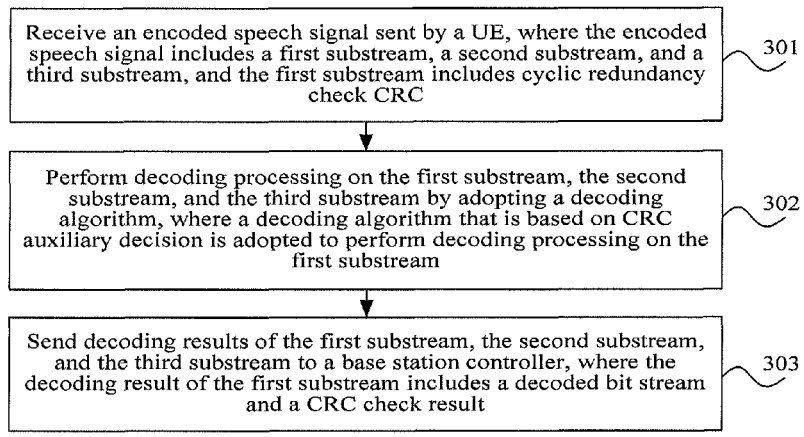
FIG. 3 is a flow chart of a first method embodiment of speech signal processing according to the present invention.

FIG. 3 is a flow chart of a first method embodiment of speech signal processing according to the present invention. As shown in FIG. 3, a method of this embodiment is the improvement of the method which is executed by a CC Decoder of the NodeB in FIG. 1, and the method of this embodiment may include:

Step 301: Receive an encoded speech signal sent by a UE, where the encoded speech signal includes a first substream, a second substream, and a third substream, and the first substream includes cyclic redundancy check CRC.

For example, the NodeB, may receive the encoded speech signal sent by the UE. The encoded speech signal then may be an AMR speech signal after the encoding processing is performed by the CC Encoder in FIG. 1. The AMR speech signal then may include three substreams A, B, and C in FIG. 2, which respectively correspond to the first substream, the second substream, and the third substream. The first substream, namely, substream A, includes CRC.

Step 302: Perform decoding processing on the first substream, the second substream, and the third substream by adopting a decoding algorithm, where a decoding algorithm that is based on CRC auxiliary decision is adopted to perform decoding processing on the first substream.

The NodeB specifically may be the CC Decoder which is in the NodeB and may adopt the decoding algorithm to perform decoding processing respectively on the first substream, the second substream, and the third substream. To improve performance of convolutional code decoding on the first substream, namely, substream A, by the NodeB in the prior art, in this embodiment, the decoding algorithm that is based on the CRC auxiliary decision is adopted to perform decoding processing on the first substream, namely, substream A. Because the decoding algorithm that is based on the CRC auxiliary decision requires auxiliary decision of the CRC, while neither the second substream nor the third substream includes CRC, a VA decoder in the prior art may be adopted to perform decoding processing on the second substream and the third substream, namely, substream B and substream C.

Specifically, the inventor finds through researches that, the decoding algorithm that is based on the CRC auxiliary decision may effectively improve the decoding performance of convolutional codes. Its basic principle is: Multiple global best candidate paths are output through a Viterbi algorithm, and through the CRC, CRC is performed respectively on the decoding results which are corresponding to these paths; a decoding result with correct CRC result is chosen as a final result, and if the decoding results which are corresponding to all the paths fail to pass the CRC, the decoding result of the best path is output as the final result. Because the decoding algorithm can choose among multiple paths including the best path, the performance is better than the performance of a common Viterbi algorithm that only choose the best path. Through research and simulation, in a 1% BLER condition, taking an example that the decoding algorithm that is based on the CRC auxiliary decision is a parallel list Viterbi decoding algorithm of 4 candidate paths (hereinafter referred to as PLVA-4), the decoding performance is about 0.2 dB to 0.8 dB higher than the VA decoding performance.

Step 303: Send the decoding results of the first substream, the second substream, and the third substream to a base station controller, where the decoding result of the first substream includes a decoded bit stream and a CRC result.

Figure 2:
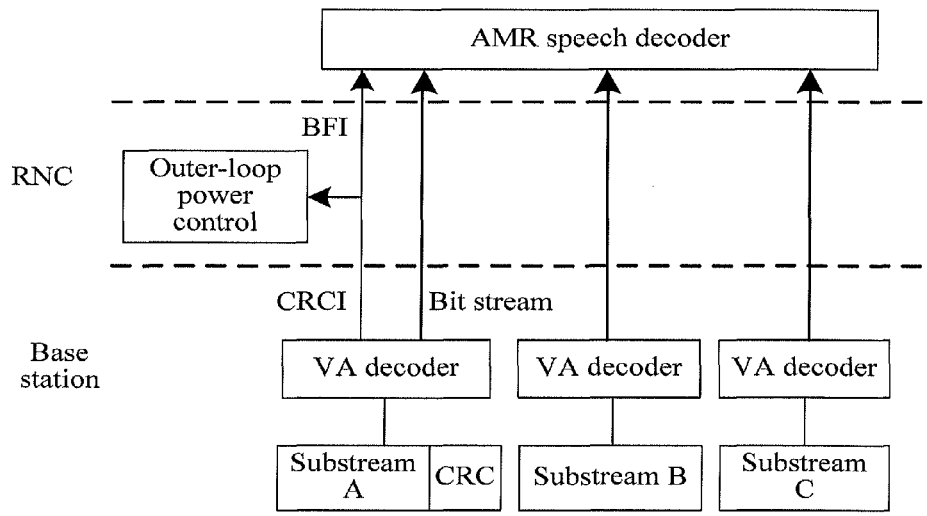
FIG. 2 is a schematic structural diagram of processing three substreams in the system architecture which is shown in FIG. 1.

After the decoding processing executed in step 302 is finished, the NodeB, specifically may be the CC Decoder which is in the NodeB and then may send the decoding results to the base station controller, for example, the RNC, so that the RNC can be enabled to send the decoding results to an AMR Speech Decoder in a CN in a manner which is shown in FIG. 2, while the CRC result which is included in the decoding result of the first substream can be sent to the Outer-Loop Power Control in the RNC. The subsequent implementation process is the same as that in the prior art, which is not repeatedly described here again.

In this embodiment, the base station can adopt the decoding algorithm that is based on the CRC auxiliary decision to perform decoding processing on the first substream, and compared with the decoding processing which is performed by adopting a common VA decoding algorithm in the prior art, the decoding performance on the first substream can be improved; while because the first substream is relatively important for the speech quality, in this embodiment, the decoding performance of the first substream can be improved to improve the speech quality and meet users' higher requirements for the speech quality.

Further, the decoding algorithm that is based on the CRC auxiliary decision and is used in the foregoing embodiment may be a list Viterbi decoding algorithm (hereinafter referred to as LVA), or a bit inversion decoding algorithm. Further, the PLVA, or, a serial LVA (hereinafter referred to as SLVA) may be preferred in the foregoing embodiment.

Figure 4:
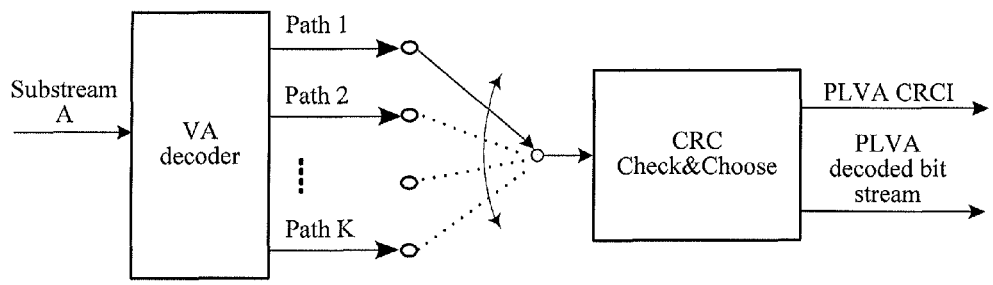
FIG. 4 is a schematic structural diagram of a PLVA used in a method embodiment of speech signal processing according to the present invention.

FIG. 4 is a schematic structural diagram of the PLVA that is used in the method embodiment of speech signal processing according to the present invention. As shown in FIG. 4, a PLVA decoder includes the VA decoder and a CRC&Choose (CRC Check&Choose) module. The VA decoder includes K candidate paths, that is, Path1 to PathK. Substream A is input in the VA decoder. The VA decoder may output K global best candidate paths Path1 to PathK by adopting the Viterbi algorithm. The CRC&Choose module can perform CRC respectively on the decoding results which are corresponding to Path1 to PathK through the CRC which is included in substream A, and choose a decoding result with a correct CRC result as a final decoding result, for example, choosing the decoding result which is corresponding to the Path2 as the final result. If none of the decoding results which are corresponding to Path1 to PathK can pass the CRC, that is, all decoding results are wrong, the decoding result of the best path is output as the final decoding result. The best path, for example, may be preset Path1, and then the best path is a maximum likelihood path which is determined by adopting the VA algorithm. Finally, the CRC&Choose module can output to the RNC the PLVA CRC indicator (hereinafter referred to as PLVA CRCI) and a PLVA decoding bit stream.

Further, in the foregoing embodiment, the PLVA-4 is preferred. The PLVA-4 being adopted is a compromise between the current performance gain and the complexity. When the number of candidate paths K>4, the performance gain does not increase much, while when K is larger, it indicates that the probability of omission of CRC increases. It can be understood by persons skilled in the art that PLVA-2, PLVA-6, PLVA-8, PLVA-12 or PLVA-16 can also be used in the foregoing embodiment. In addition, it can be understood by persons skilled in the art that, the decoding algorithm that is based on the CRC auxiliary decision may also adopt other algorithms such as the SLVA and the bit inversion decoding algorithm, which have similar implementation principles and are not repeatedly described here again.

On the basis of the foregoing embodiment which is shown in FIG. 3, the inventor finds that the common VA decoder in the base station is directly replaced with a decoder that is based on the CRC auxiliary decision, for example, directly replaced with the PLVA decoder, which can actually improve the decoding performance of the first substream, namely, substream A, but reduces a mean opinion score (hereinafter referred to as MOS) of the speech. Specifically, in the Outer-Loop Power Control, one same target BLER (hereinafter referred to as Target BLER) is preset for substream A, substream B, and substream C. Once the decoding performance of substream A becomes better, the BLER of substream A is lower than the Target BLER which is set by the Outer-Loop Power Control. Therefore, the Outer-Loop Power Control needs to reduce AMR power. However, once the AMR power is reduced, the final result is that the BLER of substream A keeps unchanged, but the BLERs of substreams B and C increase, so that the MOS score of the speech is reduced, and the experiment shows that the AMR power is reduced by 0.3 dB and the MOS score is reduced by about 0.1.

To avoid reducing the MOS score when the technical solutions of the embodiment which is shown in FIG. 3 are adopted, the embodiment of the present invention provides three solutions, and these three solutions are illustrated in detail in the following.

Solution 1: Reduce a target block error ratio of the outer-loop power control.

By reducing the Target BLER of the Outer-Loop Power Control, the Outer-Loop Power Control may be enabled to reduce a Target SINR of substream A, and BLERs of substreams B and C can keep unchanged. Therefore, the solution does not require the Outer-Loop Power Control to reduce the AMR power, so that the MOS score of the speech is not reduced.

An advantage of the solution lies in that a product code does not need to be modified and only the Target BLER of the Outer-Loop Power Control needs to be modified.

Solution 2: Reduce a channel resource occupied by the first substream, and increase channel resources occupied by the second substream and the third substream.

In specific implementation, the channel resource occupied by the first substream can be reduced and the channel resources occupied by the second substream and the third substream can be increased by reducing a rate matching parameter of substream A and increasing rate matching parameters of substream B and substream C. Persons skilled in the art may also adopt other measures to reconfigure channel resources of the three substreams, as long as an objective of reducing the channel resource occupied by the first substream and increasing the channel resources occupied by the second substream and the third substream can be achieved.

In the solution, by reconfiguring rate matching parameters of substreams A, B, and C, the rate matching parameter of substream A is enabled to be reduced, and the rate matching parameters of substream B and substream C are enabled to be increased, so as to transfer a part of transmission resources of substream A to substreams B and C, so that the three substreams are enabled to reach a new balance under the PLVA, thereby avoiding reduction of the MOS score.

An advantage of the solution lies in that few changes are made to a product.

Solution 3: Adopt a technical solution in which two CRCs are reported.

In the technical solution, the base station can adopt the decoding algorithm that is based on the CRC auxiliary decision to acquire decoding results on multiple candidate paths. The CRC that is included in the first substream is applied to perform CRC on the decoding results on the multiple candidate paths to acquire a decoding result on a path with a correct CRC result, a CRC result of the correct path, and a CRC result of the best path. And then, the base station can send to the base station controller the decoding result on the correct path, the CRC result of the correct path, and the check result of the best path, so that the base station controller sends the check result of the best path to an outer-loop power control module, sends the decoding result on the correct path to a core network, and according to the CRC result of the correct path, sends a bad frame indicator to the core network.

Figure 5:
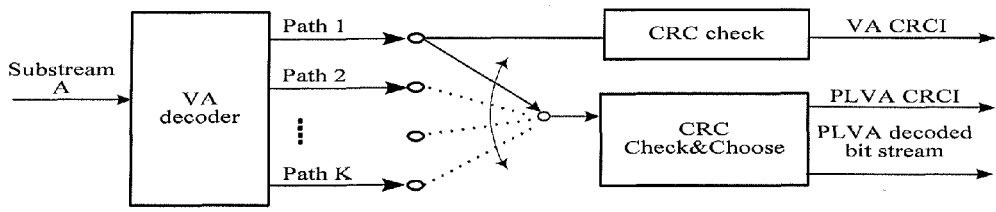
FIG. 5 is a schematic structural diagram of another PLVA decoder used in a method embodiment of speech signal processing according to the present invention.

Taking an example that the decoding algorithm that is based on the CRC auxiliary decision is the PLVA, FIG. 5 is a schematic structural diagram of another PLVA decoder which is used in a method embodiment of speech signal processing according to the present invention. As shown in FIG. 5, the PLVA decoder, compared with the PLVA decoder which is shown in FIG. 4, may include three outputs. The three outputs include the VA CRCI, the PLVA CRCI, and the PLVA decoding bit stream. The VA CRCI is the CRC result of the best path, where the best path is a preset path, for example, Path1, while the VA CRCI and the CRCI that is output by the VA decoder are equivalent. The PLVA CRCI is the CRC result of the correct path, and the correct path may be the same as the best path, for example, both the correct path and the best path are Path 1, and at this time, the PLVA CRCI and the VA CRCI are the same. And the correct path may also be different from the best path, for example, the correct path is Path2, and then the PLVA CRCI is a check result of Path2, and the PLVA decoding bit stream is the decoding result of the correct path. If all paths in the candidate paths are incorrect, the CRC&Choose module of the PLVA decoder also outputs the CRC result of the best path, that also is, three outputs of the PLVA decoder are respectively the decoding result of the best path, the CRC result of the best path, and the CRC result of the best path, and at this time, the PLVA decoder is equivalent to the VA decoder. The Outer-Loop Power Control still uses the VA CRCI, while the PLVA CRCI is sent to the AMR Speech Decoder and is used for indicating whether a speech frame is available.

It can be known from the foregoing description of the principle of the PLVA that, if the decoding result corresponding to the best path is correct, a result of VA decoding and a result of PLVA decoding are the same, and two CRC results are both correct; if the decoding result corresponding to the best path is wrong, and the decoding results which are corresponding to other candidate paths are correct, the VA CRC result is wrong, the PLVA CRC result is correct, and the PLVA outputs the correct decoding result; if the decoding results corresponding to all the candidate paths are wrong, the PLVA outputs the decoding result which is corresponding to the best path. Therefore, when the VA CRC result is correct, the CRC result of the PLVA is definitely correct. On the contrary, the PLVA CRC result is correct, but the VA CRC result is not necessarily correct.

And then, through an Iub interface between the NodeB and the RNC, the NodeB can send the VA CRCI and the PLVA CRCI to the RNC. The RNC can utilize the VA CRCI to perform the outer-loop power control, and according to the PLVA CRCI, the BFI can be sent by the RNC to the CN to indicate whether a corresponding speech frame is correct. The NodeB can further perform framing on the PLVA decoded substream A, and substreams B and C obtained through the VA decoding, and send the framing result to the AMR Speech Decoder.

The AMR Speech Decoder can perform speech decoding according to the received AMR speech signal which includes three substreams and a received corresponding BFI indicator. The Outer-Loop Power Control module of the RNC can perform power control according to the VA CRCI which is output by the PLVA, which can be implemented by adopting the prior art, and is not repeatedly described again.

The foregoing three technical solutions are illustrated in detail by adopting three specific embodiments in the following.

Figure 6:
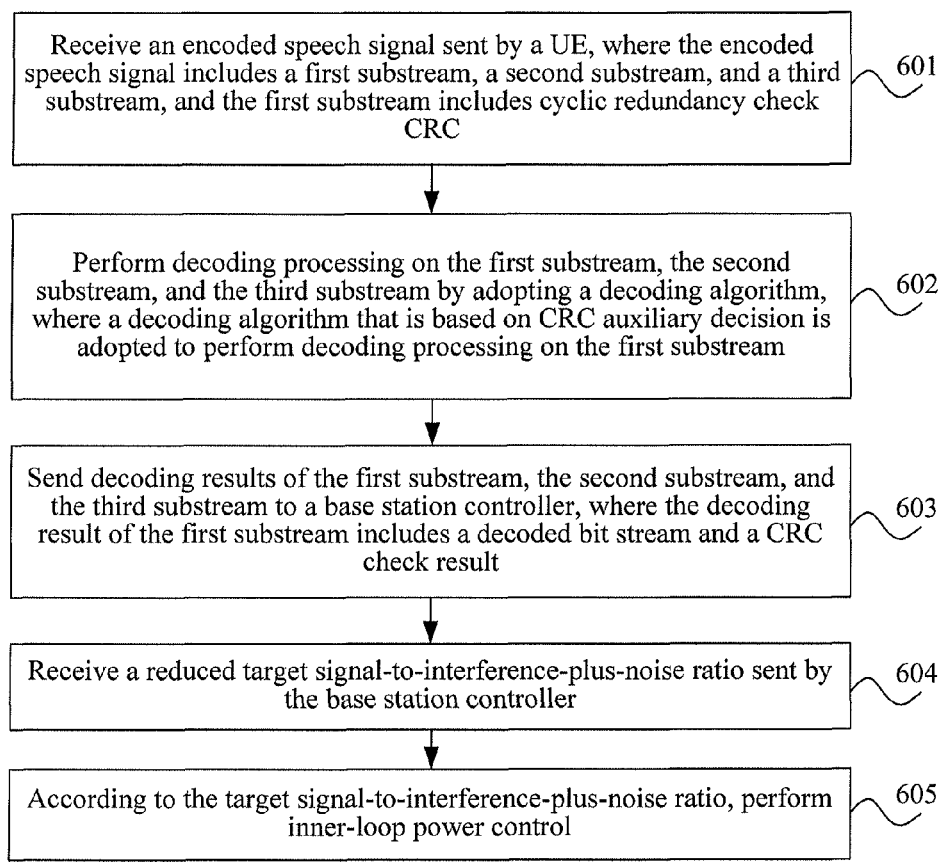
FIG. 6 is a flow chart of a second method embodiment of speech signal processing according to the present invention.

FIG. 6 is a flow chart of a second method embodiment of speech signal processing according to the present invention. As shown in FIG. 6, the method of this embodiment is used for implementing the foregoing first solution. The method of this embodiment may include:

Step 601: Receive an encoded speech signal sent by a UE, where the encoded speech signal includes a first substream, a second substream, and a third substream, and the first substream includes CRC.

Step 602: Perform decoding processing on the first substream, the second substream, and the third substream by adopting a decoding algorithm, where a decoding algorithm that is based on CRC auxiliary decision is adopted to perform decoding processing on the first substream.

Step 603: Send decoding results of the first substream, the second substream, and the third substream to a base station controller, where the decoding result of the first substream includes a decoded bit stream and a CRC result.

Implementation principles of the foregoing step 601 to step 603 are similar to that of step 301 to step 303 in a method embodiment which is shown in FIG. 3, which are not repeatedly described here again.

Step 604: Receive a reduced target signal-to-interference-plus-noise ratio which is sent by the base station controller.

Step 605: According to the target signal-to-interference-plus-noise ratio, perform inner-loop power control.

Step 604 and step 605 may be specifically executed by an inner-loop power control module in a NodeB.

In this embodiment, by reducing a Target BLER of Outer-Loop Power Control, the Outer-Loop Power Control can be enabled to reduce a Target SINR of the first substream, and BLERs of the second substream and the third substream can be kept unchanged. Therefore, the solution does not require the Outer-Loop Power Control to reduce AMR power, and therefore, a MOS score of the speech is not reduced. Moreover, in this embodiment, a product code does not need to be modified, and only the Target BLER of the Outer-Loop Power Control needs to be modified, which is easy to implement.

Figure 7:
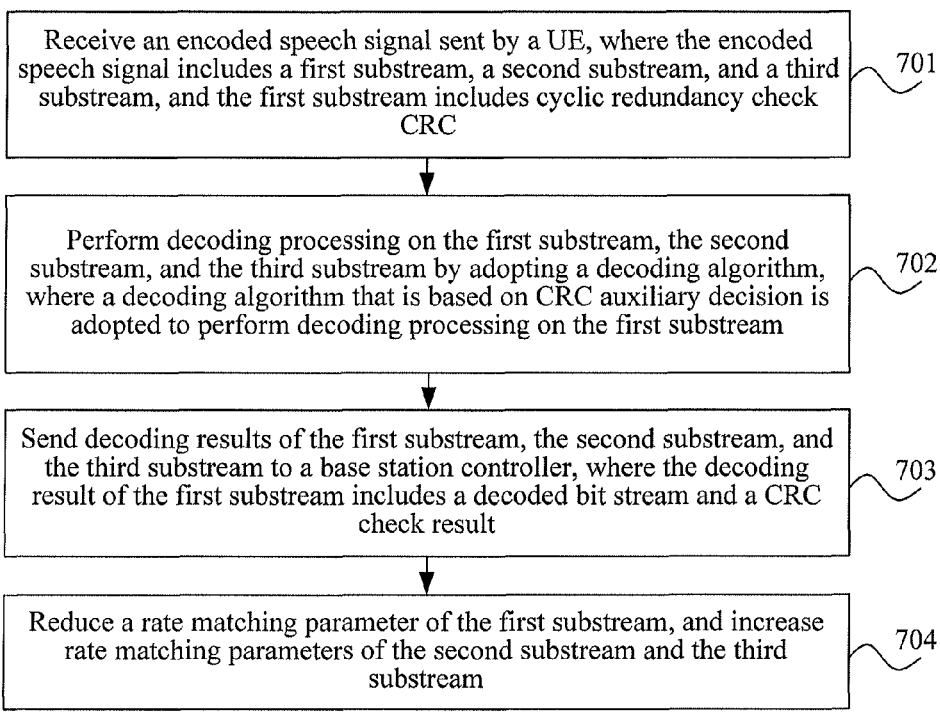
FIG. 7 is a flow chart of a third method embodiment of speech signal processing according to the present invention.

FIG. 7 is a flow chart of a third method embodiment of speech signal processing according to the present invention. As shown in FIG. 7, a method of this embodiment may include:

Step 701: Receive an encoded speech signal sent by a UE, where the encoded speech signal includes a first substream, a second substream, and a third substream, and the first substream includes CRC.

Step 702: Perform decoding processing on the first substream, the second substream, and the third substream by adopting a decoding algorithm, where a decoding algorithm that is based on CRC auxiliary decision is adopted to perform decoding processing on the first substream.

Step 703: Send decoding results of the first substream, the second substream, and the third substream to a base station controller, where the decoding result of the first substream includes a decoded bit stream and a CRC result.

Implementation principles of the foregoing step 701 to step 703 are similar to that of step 301 to step 303 in a method embodiment which is shown in FIG. 3, which are not repeatedly described here again.

Step 704: Reduce a rate matching parameter of the first substream, and increase rate matching parameters of the second substream and the third substream.

In this embodiment, by reconfiguring rate matching parameters of three substreams, the rate matching parameter of the first substream is enabled to be reduced, and the rate matching parameters of the second substream and the third substream are enable to be increased, so as to transfer a part of transmission resources of the first substream to the second and the third substreams, so that the three substreams are enabled to reach a new balance under a PLVA, thereby avoiding reduction of a MOS score. The technical solution makes few changes to a product and is simple to implement.

Figure 8:
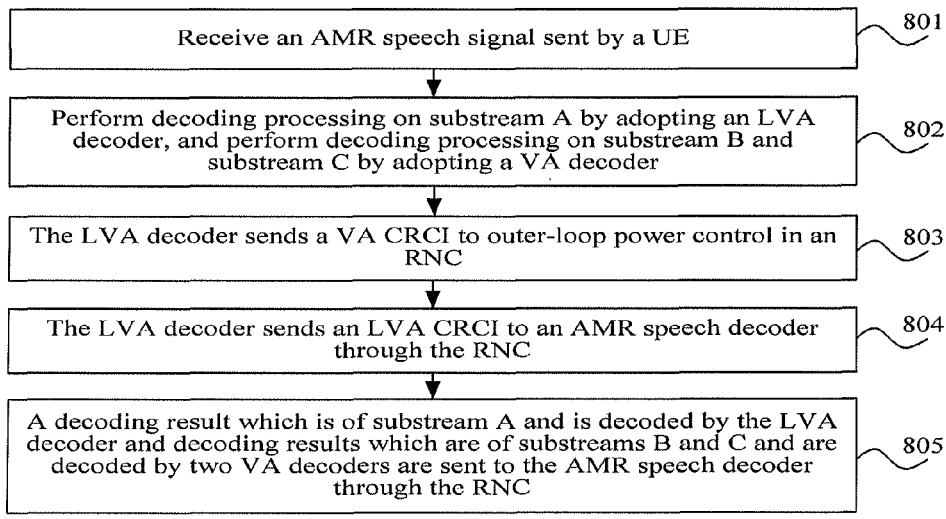
FIG. 8 is a flow chart of a fourth method embodiment of speech signal processing according to the present invention.
Figure 9:
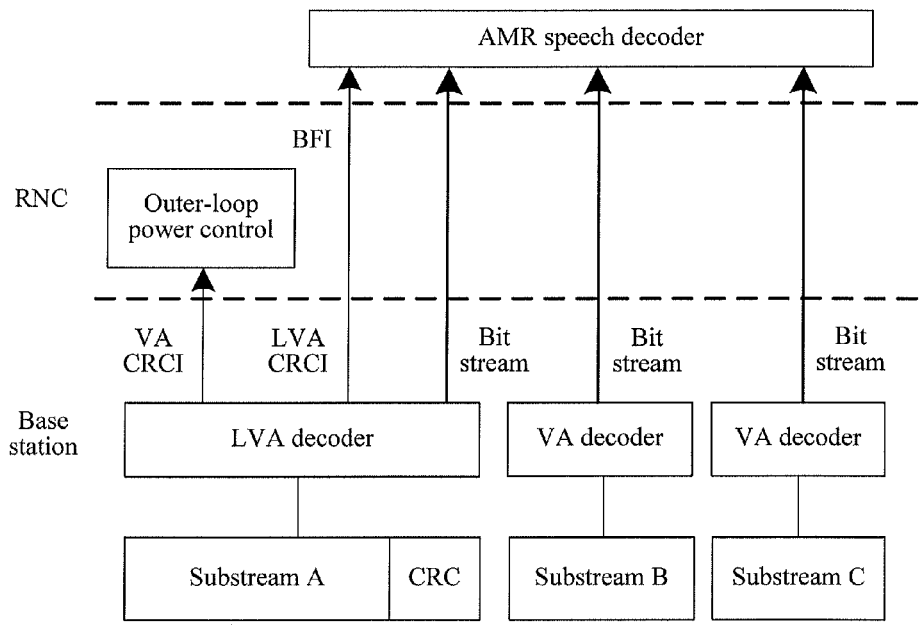
FIG. 9 is a schematic structural diagram of processing three substreams in the fourth method embodiment which is shown in FIG. 8.

FIG. 8 is a flow chart of a fourth method embodiment of speech signal processing according to the present invention. FIG. 9 is a schematic structural diagram of processing three substreams in a fourth method embodiment which is shown in FIG. 8. As shown in FIGS. 8 and 9, a method of this embodiment may include:

Step 801: Receive an AMR speech signal sent by a UE.

The AMR speech signal includes three substreams A, B, and C, namely, Class A, Class B, and Class C, where after a data block of Class A, CRC is attached, and data blocks of substreams B and C are not followed with CRC.

Step 802: Perform decoding processing on substream A by adopting an LVA decoder, and perform decoding processing on substream B and substream C by adopting a VA decoder.

Step 803: The LVA decoder sends a VA CRCI to an outer-loop power control module (Outer-Loop Power Control) in an RNC.

Step 804: The LVA decoder sends an LVA CRCI to an AMR speech decoder (AMR Speech Decoder) through the RNC.

Step 805: A decoding result which is of substream A and is decoded by the LVA decoder and decoding results which are of substreams B and C and are decoded by two VA decoders are sent to the AMR speech decoder through the RNC.

It should be noted that, no sequence may lie between step 803 and step 804.

The inventor adopts the foregoing technical solution to perform system simulation, and it can be known from a simulation result that, for substream A of an AMR 12.2 k service, a PLVA-4, relative to the VA, has performance gain of about 0.3 dB. Through a solution that is reported by double-CRC, when BLER=1%, the gain of a MOS score of 0.1 can be obtained; when BLER=10%, the gain of the MOS score of 0.35 can be obtained. When the BLER in the system is larger, the gain which is of the MOS score and is brought by a PLVA is larger.

In this embodiment, by adopting a double-CRC solution, it is enabled that a speech processing system with power control, such as a WCDMA system, neither needs to modify a Target BLER of the Outer-Loop Power Control, nor needs to modify rate matching parameters of substreams A, B, and C, and instead, the performance gain brought by a LVA is directly converted into the gain of a speech MOS score. Because substream A is most important in the AMR speech, the method can improve the speech performance to the greatest extent and meanwhile has the smallest influence on the existing system.

Figure 10:
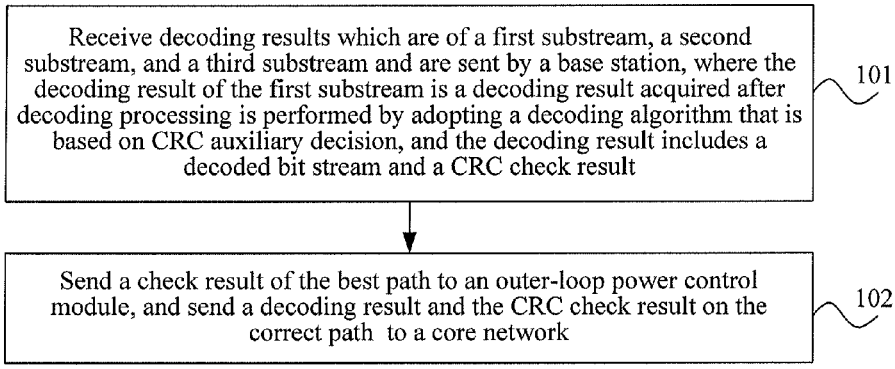
FIG. 10 is a flow chart of a fifth method embodiment of speech signal processing according to the present invention.

FIG. 10 is a flow chart of a fifth method embodiment of speech signal processing according to the present invention. As shown in FIG. 10, a method of this embodiment may include:

Step 101: Receive decoding results which are of a first substream, a second substream, and a third substream, and are sent by a base station, where the decoding result of the first substream is a decoding result acquired after decoding processing is performed by adopting a decoding algorithm that is based on CRC auxiliary decision, and the decoding result includes a decoded bit stream and a CRC result.

Step 102: Send a check result of the best path to an outer-loop power control module, and send a decoding result and a CRC result on the correct path to a core network.

This embodiment is a technical solution which is executed by a base station controller and is corresponding to the technical solution which is executed by the base station and is shown in FIG. 3, and its implementation principle is illustrated in detail in the foregoing description of the technical solution and is not repeatedly described here again. The base station controller in this embodiment may be an RNC or a BSC. The decoding algorithm that is based on the CRC auxiliary decision in this embodiment may include a PLVA and a SLVA, which is not repeatedly described here again.

In this embodiment, the base station controller can receive the decoded bit stream and the CRC result after the base station performs decoding processing on the first substream by adopting the decoding algorithm that is based on the CRC auxiliary decision, compared with the decoding processing which is performed by adopting a common VA decoding algorithm in the prior art, in this embodiment, the decoding performance on the first substream can be improved. Because the first substream is relatively important for the speech quality, in this embodiment, the decoding performance of the first substream can be improved to improve the speech quality and meet users' higher requirements for the speech quality.

In another embodiment of the present invention, after step 102 of a method embodiment which is shown in FIG. 10, the following may further be included: instructing that the base station reduces a channel resource occupied by the first substream and increases channel resources occupied by the second substream and the third substream. The method of the embodiment corresponds to the method of the foregoing first solution, and their implementation principles and technical effects are similar, which are not repeatedly described here again.

In yet another embodiment of the present invention, after step 102 of a method embodiment which is shown in FIG. 10, the following may further be included: reducing a target block error ratio of the outer-loop power control module to enable the outer-loop power control module to send a reduced target signal-to-interference-plus-noise ratio to the base station. The method of this embodiment corresponds to the method of the foregoing second solution, and their implementation principles and technical effects are similar, which are not repeatedly described here again.

The specific implementation process of the foregoing third solution is illustrated in detail in the following.

Figure 11:
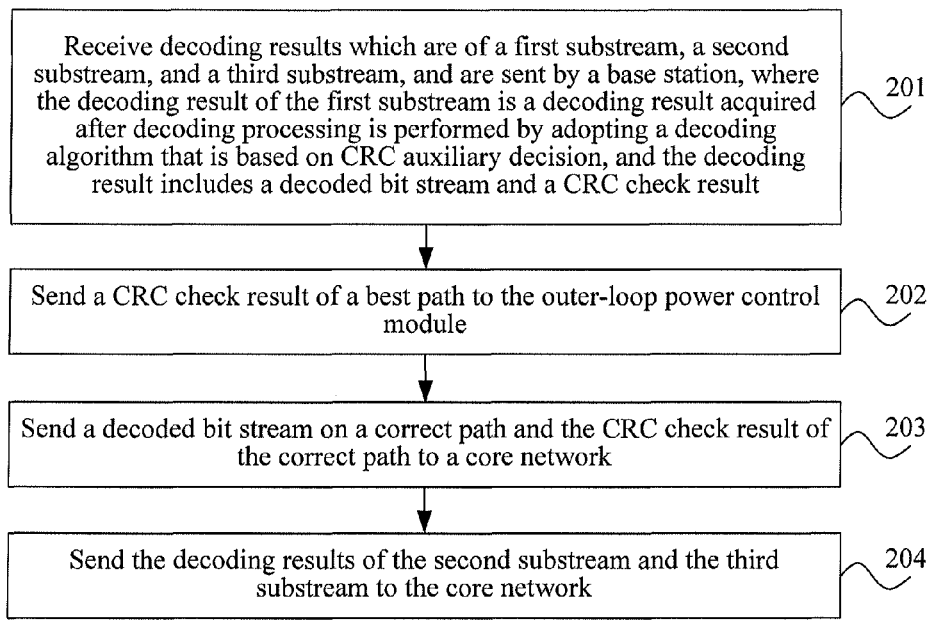
FIG. 11 is a flow chart of a sixth method embodiment of speech signal processing according to the present invention.

FIG. 11 is a flow chart of a sixth method embodiment of speech signal processing according to the present invention. As shown in FIG. 11, a method of this embodiment may include:

Step 201: Receive decoding results which are of a first substream, a second substream, and a third substream, and are sent by a base station, where the decoding result of the first substream is a decoding result acquired after decoding processing is performed by adopting a decoding algorithm that is based on CRC auxiliary decision, and the decoding result includes a decoded bit stream and a CRC result.

The CRC result may include a CRC result of a correct path and a CRC result of a best path, and the decoded bit stream is a decoded bit stream on the correct path.

Step 202: Send the CRC result of the best path to the outer-loop power control module.

Step 203: Send the decoded bit stream on the correct path and the CRC result of the correct path to a core network.

Step 204: Send the decoding results of the second substream and the third substream to the core network.

No execution sequence may lie among step 202 to step 204.

In this embodiment, by adopting a double-CRC solution, it is enabled that a speech processing system with power control, such as a WCDMA system, neither needs to modify a Target BLER of Outer-Loop Power Control, nor needs to modify rate matching parameters of three substreams, and instead, the performance gain brought by the decoding algorithm that is based on the CRC auxiliary decision is directly converted into the gain of a speech MOS score. Because the first substream is most important in an AMR speech, in this embodiment, the speech performance can be improved to the greatest extent and meanwhile the influence on the existing system is the smallest.

It should be noted that for a broadband AMR speech and a part of narrowband AMR speeches, the number of bits of substream C is 0. Although in the foregoing embodiments, only the narrowband AMR speech of which the number of bits of substream C is not 0 is taken as an example for illustration, persons skilled in the art may understand that the technical solutions in the embodiments of the present invention are also applicable to the broadband AMR speech and the narrowband AMR speech of which the number of bits of substream C is 0, and their implementation principles are similar to that of the foregoing embodiments, which are not repeatedly described here again.

Figure 12:
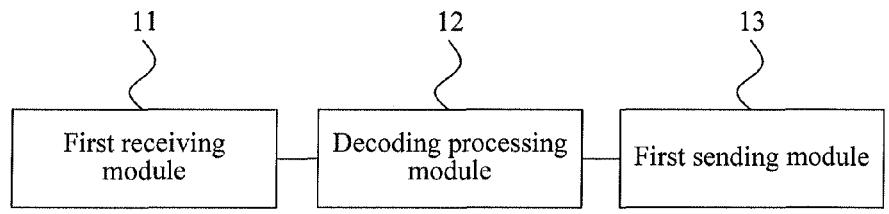
FIG. 12 is a schematic structural diagram of a first embodiment of a base station according to the present invention.

FIG. 12 is a schematic structural diagram of a first embodiment of a base station according to the present invention. As shown in FIG. 12, the base station in this embodiment may include a first receiving module 11, a decoding processing module 12, and a first sending module 13. The first receiving module 11 is configured to receive an encoded speech signal sent by a UE, where the encoded speech signal includes a first substream, a second substream, and a third substream, and the first substream includes CRC. The decoding processing module 12 is configured to perform decoding processing on the first substream, the second substream, and the third substream by adopting a decoding algorithm, where a decoding algorithm that is based on CRC auxiliary decision is adopted to perform decoding processing on the first substream. The first sending module 13 is configured to send decoding results of the first substream, the second substream, and the third substream to a base station controller, where the decoding result of the first substream includes a decoded bit stream and a CRC result.

The base station in this embodiment can be used to execute the method of a method embodiment which is shown in FIG. 3, and their implementation principles and technical effects are similar, which are not repeatedly described here again. The base station in this embodiment may be a BTS, a NodeB or an eNB.

Figure 13:
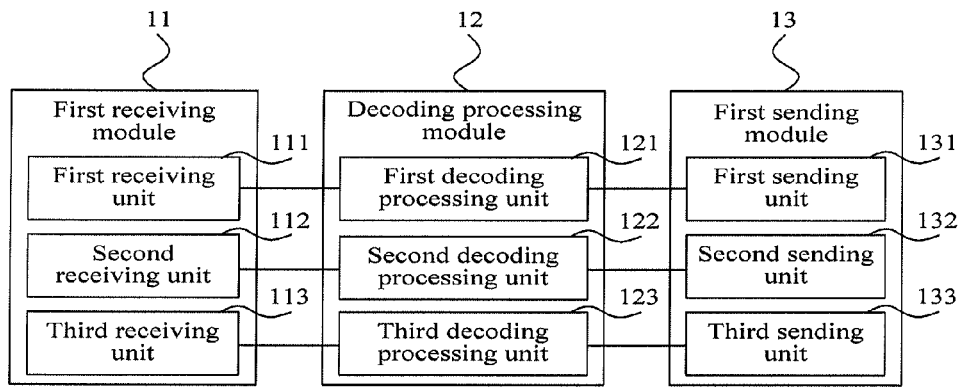
FIG. 13 is a schematic structural diagram of a second embodiment of a base station according to the present invention.

FIG. 13 is a schematic structural diagram of a second embodiment of a base station according to the present invention. As shown in FIG. 13, for the base station in this embodiment, on the basis of a base station which is shown in FIG. 12, further, a first receiving module 11 may include a first receiving unit 111, a second receiving unit 112, and a third receiving unit 113. The first receiving unit 111 is configured to receive the first substream; the second receiving unit 112 is configured to receive the second substream; the third receiving unit 113 is configured to receive the third substream. The decoding processing module 12 may include a first decoding processing unit 121, a second decoding processing unit 122, and a third decoding processing unit 123. The first decoding processing unit 121 is configured to perform decoding processing on the first substream by adopting a parallel list Viterbi decoding algorithm to acquire decoding results on multiple candidate paths, and perform CRC on the decoding results on the multiple candidate paths by applying the CRC to acquire a decoding result on a path of a correct CRC result, the CRC result of the correct path, and a CRC result of a best path, where the best path is a maximum likelihood path which is determined by adopting a Viterbi decoding algorithm. The second decoding processing unit 122 is configured to perform decoding processing on the second substream by adopting the Viterbi decoding algorithm to acquire a decoding result. The third decoding processing unit 123 is configured to perform decoding processing on the third substream by adopting the Viterbi decoding algorithm to acquire a decoding result. The first sending module 13 may include a first sending unit 131, a second sending unit 132, and a third sending unit 133. The first sending unit 131 is configured to send to a base station controller the decoding result on the correct path, the CRC result of the correct path, and the check result of the best path which are acquired by the first decoding processing unit, so that the base station controller sends the check result of the best path to an outer-loop power control module, and sends the decoding result and the CRC result on the correct path to a core network. The second sending unit 132 is configured to send the decoding result acquired by the second decoding processing unit to the base station controller. The third sending unit 133 is configured to send the decoding result acquired by the third decoding processing unit to the base station controller.

The base station in this embodiment can be used to execute the technical solution described in the foregoing third solution, and it specifically may execute the method of a method embodiment which is shown in FIG. 8. Their implementation principles and technical effects are similar, which are not repeatedly described here again.

Figure 14:
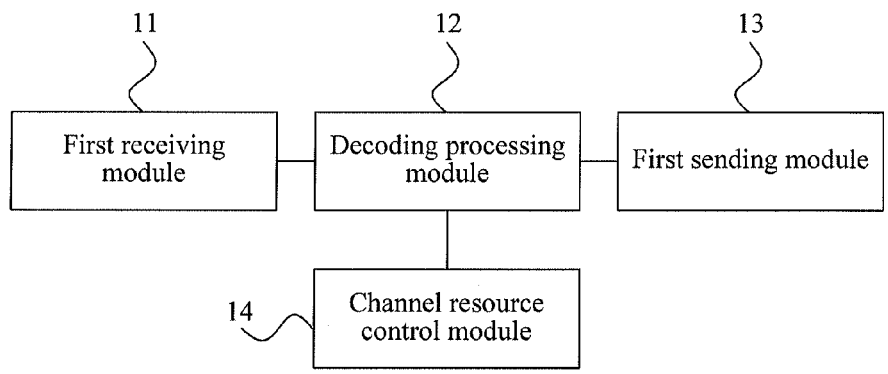
FIG. 14 is a schematic structural diagram of a third embodiment of a base station according to the present invention.

FIG. 14 is a schematic structural diagram of a third embodiment of a base station according to the present invention. As shown in FIG. 14, the base station in this embodiment, on the basis of a base station which is shown in FIG. 12, further includes a channel resource control module 14, which is configured to reduce a channel resource occupied by the first substream and increase channel resources occupied by the second substream and the third substream.

The base station in this embodiment can be used to execute the technical solution described in the foregoing first solution, and it specifically may execute a method of the method embodiment which is shown in FIG. 6. Their implementation principles and technical effects are similar, which are not repeatedly described here again.

Figure 15:
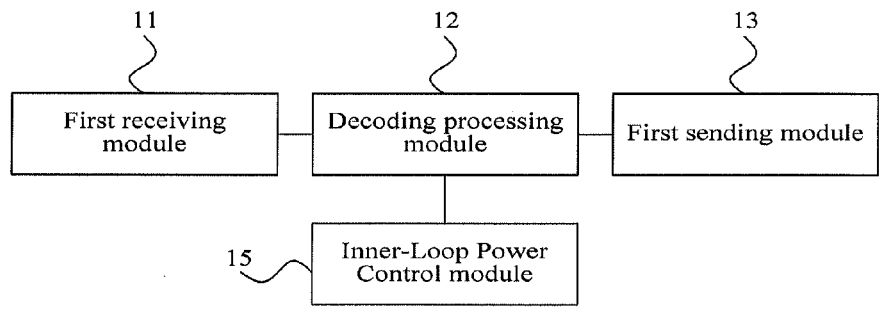
FIG. 15 is a schematic structural diagram of a fourth embodiment of a base station according to the present invention.

FIG. 15 is a schematic structural diagram of a fourth embodiment of a base station according to the present invention. As shown in FIG. 15, the base station in this embodiment, on the basis of a base station which is shown in FIG. 12, further includes an inner-loop power control module 15, which is configured to receive a reduced target signal-to-interference-plus-noise ratio sent by the base station controller, and according to the target signal-to-interference-plus-noise ratio, perform inner-loop power control.

The base station in this embodiment can be used to execute the technical solution described in the foregoing second solution, and it specifically may execute a method of the method embodiment which is shown in FIG. 7. Their implementation principles and technical effects are similar, which are not repeatedly described here again.

Figure 16:
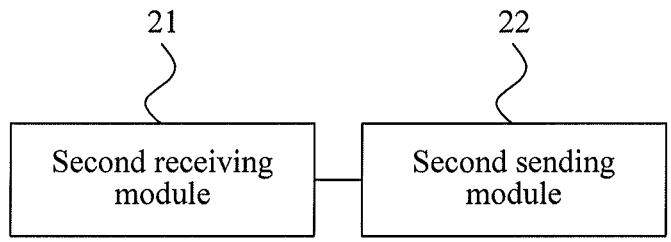
FIG. 16 is a schematic structural diagram of a first embodiment of a base station controller according to the present invention.

FIG. 16 is a schematic structural diagram of a first embodiment of a base station controller according to the present invention. As shown in FIG. 16, the base station controller in this embodiment may include a second receiving module 21 and a second sending module 22. The second receiving module 21 is configured to receive decoding results which are of a first substream, a second substream, and a third substream, and are sent by a base station, where the decoding result of the first substream is a decoding result acquired after decoding processing is performed by adopting a decoding algorithm that is based on cyclic redundancy check CRC auxiliary decision, and the decoding result includes a decoded bit stream and a CRC result. The second sending module 22 is configured to send the CRC result to an outer-loop power control module, and send to a core network the decoded bit stream and the CRC result that are of the first substream, and the decoding results of the second substream and the third substream.

The base station controller in this embodiment can be used to execute a technical solution in the foregoing method embodiment which is shown in FIG. 10, and their implementation principles and technical effects are similar, which are not repeatedly described here again.

Figure 17:
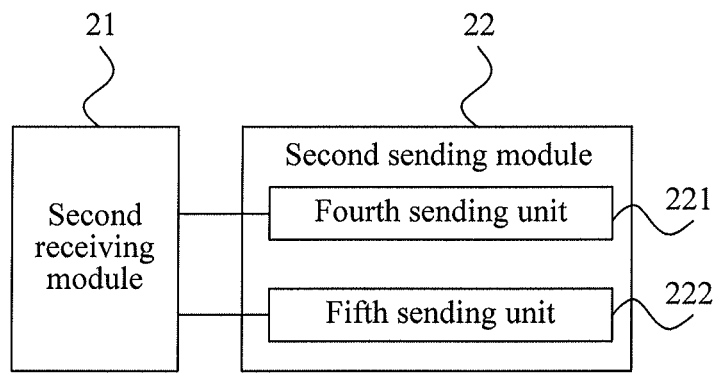
FIG. 17 is a schematic structural diagram of a second embodiment of a base station controller according to the present invention.

FIG. 17 is a schematic structural diagram of a second embodiment of a base station controller according to the present invention. As shown in FIG. 17, a CRC result includes a CRC result of a correct path and a CRC result of a best path, and a decoded bit stream is a decoded bit stream on the correct path, where the best path is a maximum likelihood path determined by adopting a Viterbi decoding algorithm. For the base station controller in this embodiment, on the basis of a base station controller which is shown in FIG. 16, further, the second sending module 22 includes: a fourth sending unit 221 and a fifth sending unit 222. The fourth sending unit 221 is configured to send the CRC result of the best path to the outer-loop power control module. The fifth sending unit 222 is configured to send the decoded bit stream on the correct path and the CRC result of the correct path to a core network, and send the decoding results of the second substream and the third substream to the core network.

The base station controller in this embodiment can be used to execute the technical solution described in the foregoing third solution, and it specifically may execute the technical solution which is shown in FIG. 11. Their implementation principles and technical effects are similar, which are not repeatedly described here again.

Figure 18:
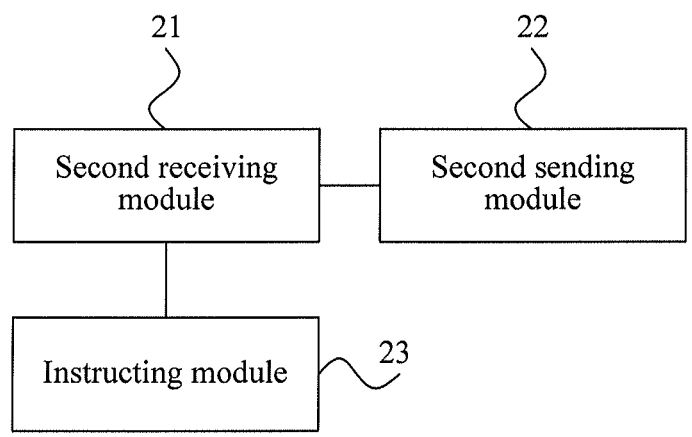
FIG. 18 is a schematic structural diagram of a third embodiment of a base station controller according to the present invention.

FIG. 18 is a schematic structural diagram of a third embodiment of a base station controller according to the present invention. As shown in FIG. 18, the base station controller in this embodiment, on the basis of the base station controller which is shown in FIG. 16, further includes an instructing module 23, which is configured to instruct that the base station reduces a channel resource occupied by the first substream, and increases channel resources occupied by the second substream and the third substream.

The base station controller in this embodiment can be used to execute the technical solution described in the foregoing first solution, and their implementation principles and technical effects are similar, which are not repeatedly described here again.

Figure 19:
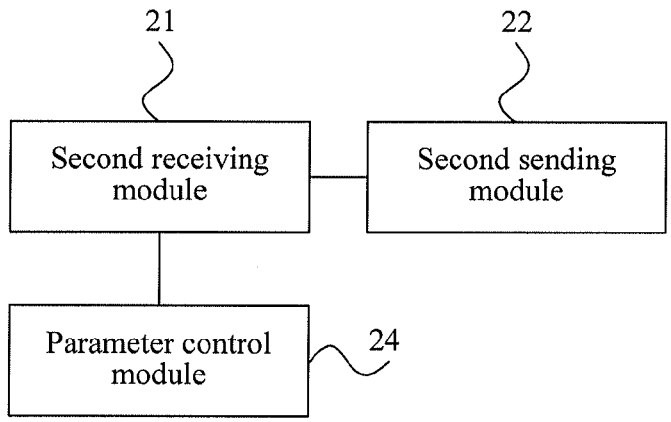
FIG. 19 is a schematic structural diagram of a fourth embodiment of a base station controller according to the present invention.

FIG. 19 is a schematic structural diagram of a fourth embodiment of a base station controller according to the present invention. As shown in FIG. 19, the base station controller in this embodiment, on the basis of a base station controller which is shown in FIG. 16, further includes a parameter control module 24, which is configured to reduce a target block error ratio of the outer-loop power control module to enable the outer-loop power control module to send a reduced target signal-to-interference-plus-noise ratio to the base station.

The base station controller in this embodiment can be used to execute the technical solution described in the foregoing second solution, and their implementation principles and technical effects are similar, which are not repeatedly described here again.

Figure 20:
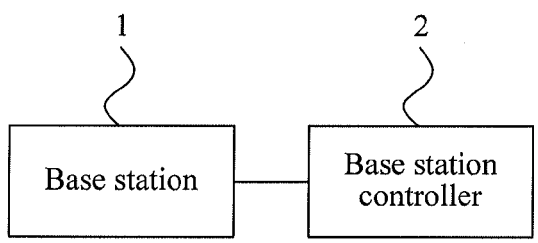
FIG. 20 is a schematic structural diagram of an embodiment of an access network system according to the present invention.

FIG. 20 is a schematic structural diagram of an embodiment of an access network system according to the present invention. As shown in FIG. 20, the access network system in this embodiment may include a base station 1 and a base station controller 2. The base station 1 can adopt a structure of any base station shown in FIG. 12 to FIG. 15, which can accordingly execute a technical solution described in any embodiment in FIG. 3 and FIGS. 6 to 8. The base station controller 2 may adopt a structure of any base station shown in FIG. 16 to FIG. 19, which can execute a technical solution shown in FIG. 10 or FIG. 11, and their implementation principles and technical effects are similar, and are not repeatedly described here again.

In the above embodiments, a process where a network side processes on an uplink AMR speech signal sent by a UE is described. Hereinafter, a process where a user equipment processes on a downlink AMR speech signal sent by a base station is given below.

Figure 21:
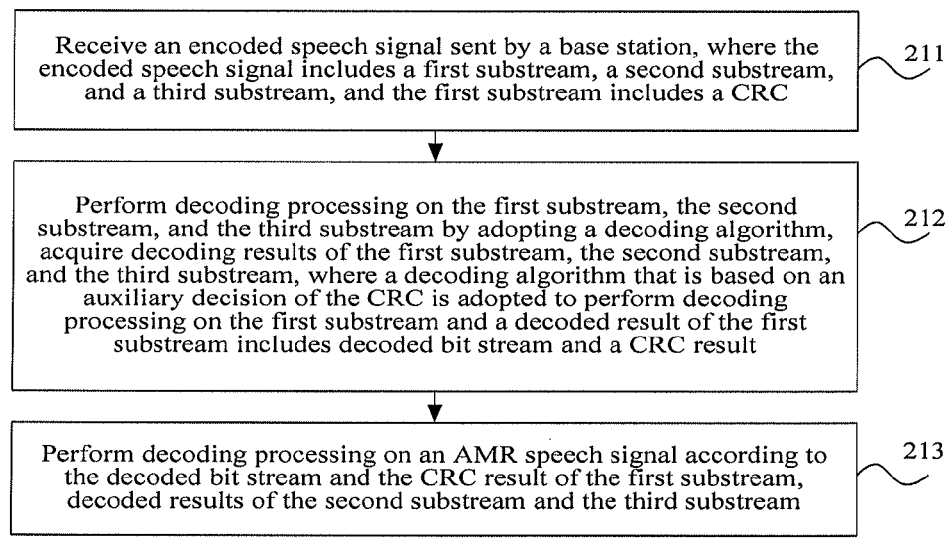
FIG. 21 is a flow chart of a seventh method embodiment of speech signal processing according to the present invention.

FIG. 21 is a flow chart of a seventh method embodiment of speech signal processing according to the present invention. As shown in FIG. 21, the method of this embodiment may include:

Step 211: Receive an encoded speech signal sent by a base station, where the encoded speech signal includes a first substream, a second substream, and a third substream, and the first substream includes a CRC.

Step 212: Perform decoding processing on the first substream, the second substream, and the third substream by adopting a decoding algorithm, acquire decoding results of the first substream, the second substream, and the third substream, where a decoding algorithm that is based on an auxiliary decision of the CRC is adopted to perform decoding processing on the first substream and a decoded result of the first substream includes decoded bit stream and a CRC result.

Step 213: Perform decoding processing on an AMR speech signal according to the decoded bit stream and the CRC result of the first substream, decoded results of the second substream and the third substream.

For example, the UE may receive the encoded speech signal sent by the base station. The encoded speech signal then may be an AMR speech signal. The AMR speech signal then may include three substreams A, B, and C, which respectively correspond to the first substream, the second substream, and the third substream. The first substream, namely, substream A, includes CRC. A CC decoder in the UE may respectively perform decoding processing on the first substream, the second substream and the third substream by adopting a decoding algorithm.

Specifically, the inventor finds through researches that, the decoding algorithm that is based on the CRC auxiliary decision may effectively improve the decoding performance of convolutional codes. Its basic principle is: Multiple global best candidate paths are output through a Viterbi algorithm, and through the CRC, CRC is performed respectively on the decoding results which are corresponding to these paths; a decoding result with correct CRC result is chosen as a final result, and if the decoding results which are corresponding to all the paths fail to pass the CRC, the decoding result of the best path is output as the final result. Because the decoding algorithm can choose among multiple paths including the best path, the performance is better than the performance of a common Viterbi algorithm that only choose the best path. Through research and simulation, in a 1% BLER condition, taking an example that the decoding algorithm that is based on the CRC auxiliary decision is a PLVA-4 of 4 candidate paths, the decoding performance is about 0.2 dB to 0.8 dB higher than the VA decoding performance.

Thus, in order to improve performance of convolutional code decoding on the first substream, namely, substream A, by the UE, in this embodiment, the decoding algorithm that is based on the CRC auxiliary decision is adopted to perform decoding processing on the first substream, namely, substream A. Because the decoding algorithm that is based on the CRC auxiliary decision requires auxiliary decision of the CRC, while neither the second substream nor the third substream includes a CRC, a VA decoder in the prior art may be adopted to perform decoding processing on the second substream and the third substream, namely, substream B and substream C.

In this embodiment, the UE can adopt the decoding algorithm that is based on the CRC auxiliary decision to perform decoding processing on the first substream, and compared with the decoding processing which is performed by adopting a common VA decoding algorithm in the prior art, the decoding performance on the first substream can be improved; while because the first substream is relatively important for the speech quality, in this embodiment, the decoding performance of the first substream can be improved to improve the speech quality and meet users' higher requirements for the speech quality.

Further, the decoding algorithm that is based on the CRC auxiliary decision and is used in the foregoing embodiment may be a LVA, or a bit inversion decoding algorithm. Further, the PLVA, or, an SLVA may be preferred in the foregoing embodiment. The PLVA is PLVA which includes 2, 4, 6, 8, 12 or 16 candidate paths.

On the basis of the foregoing embodiment which is shown in FIG. 21, the inventor finds that the common VA decoder in the UE is directly replaced with a decoder that is based on the CRC auxiliary decision, for example, directly replaced with the PLVA decoder, which can actually improve the decoding performance of the first substream, namely, substream A, but reduces a MOS of the speech. Specifically, in the Outer-Loop Power Control, one same target BLER is preset for substream A, substream B, and substream C. Once the decoding performance of substream A becomes better, the BLER of substream A is lower than the Target BLER which is set by the Outer-Loop Power Control. Therefore, the Outer-Loop Power Control needs to reduce AMR power. However, once the AMR power is reduced, the final result is that the BLER of substream A keeps unchanged, but the BLERs of substreams B and C increase, so that the MOS score of the speech is reduced, and the experiment shows that the AMR power is reduced by 0.3 dB and the MOS score is reduced by about 0.1.

To avoid reducing the MOS score when the technical solutions of the embodiment which is shown in FIG. 21 are adopted, the embodiment of the present invention provides three solutions, and these three solutions are illustrated in detail in the following.

Solution 1: Reduce a target block error ratio of the outer-loop power control.

By reducing the Target BLER of the Outer-Loop Power Control, the Outer-Loop Power Control may be enabled to reduce a Target SINR of substream A, and BLERs of substreams B and C can keep unchanged. Therefore, the solution does not require the Outer-Loop Power Control to reduce the AMR power, so that the MOS score of the speech is not reduced.

An advantage of the solution lies in that a product code does not need to be modified and only the Target BLER of the Outer-Loop Power Control needs to be modified.

Solution 2: Instruct that the base station reduces a channel resource occupied by the first substream, and increases channel resources occupied by the second substream and the third substream.

In specific implementation, the base station may be instructed that the channel resource occupied by the first substream can be reduced and the channel resources occupied by the second substream and the third substream can be increased by instructing that the base station reduces a rate matching parameter of substream A and increases rate matching parameters of substream B and substream C. Persons skilled in the art may also instruct that the base station adopts other measures to reconfigure channel resources of the three substreams, as long as an objective of reducing the channel resource occupied by the first substream and increasing the channel resources occupied by the second substream and the third substream can be achieved.

In the solution, by instructing that the base station reconfigures rate matching parameters of substreams A, B, and C, the rate matching parameter of substream A is enabled to be reduced, and the rate matching parameters of substream B and substream C are enabled to be increased, so as to transfer a part of transmission resources of substream A to substreams B and C, so that the three substreams are enabled to reach a new balance under the PLVA, thereby avoiding reduction of the MOS score.

An advantage of the solution lies in that few changes are made to a product.

Solution 3: Adopt a technical solution in which two CRCs are reported.

In the technical solution, the UE can adopt the decoding algorithm that is based on the CRC auxiliary decision to acquire decoding results on multiple candidate paths. The CRC that is included in the first substream is applied to perform CRC on the decoding results on the multiple candidate paths to acquire a decoding result on a path with a correct CRC result, a CRC result of the correct path, and a CRC result of the best path, where the best path is a maximum likelihood path which is determined by adopting a Viterbi decoding algorithm. And then, the UE may perform the outer-loop power control by adopting the CRC result of the best path, and perform decoding processing on an AMR speech signal according to the decoding result and the CRC result on the correct path, and the decoding result of the second substream and the third substream.

The specific implementation process of the foregoing third solution is illustrated in detail in the following.

Figure 22:
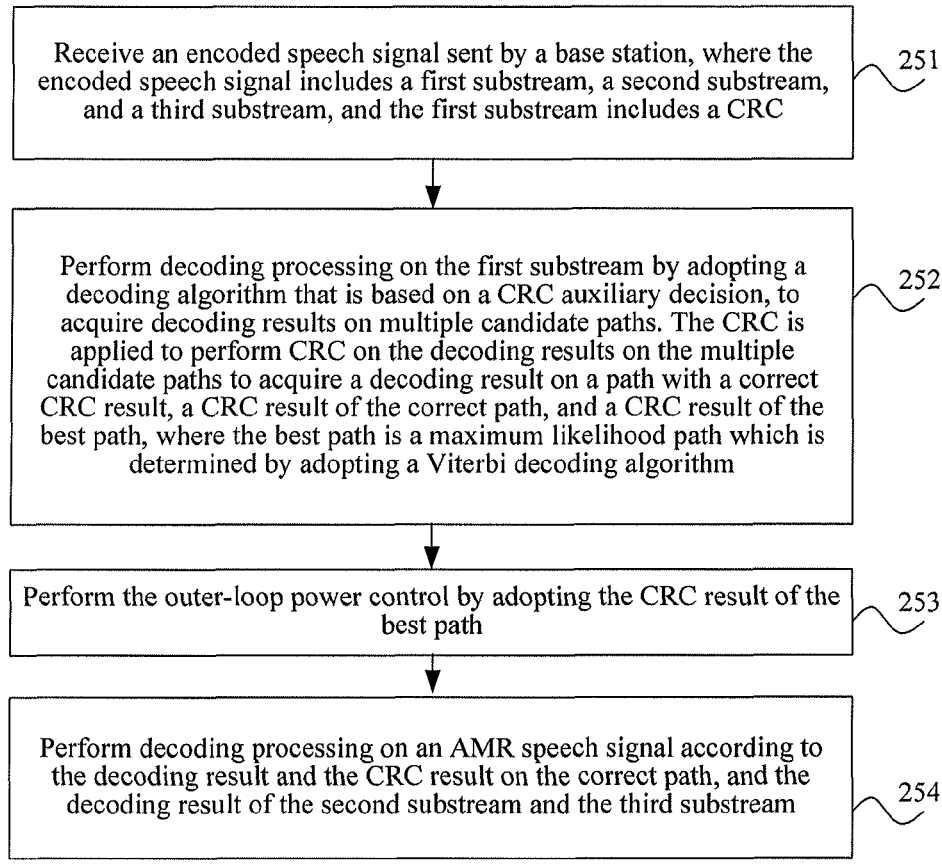
FIG. 22 is a flow chart of an eighth method embodiment of speech signal processing according to the present invention.
Figure 23:
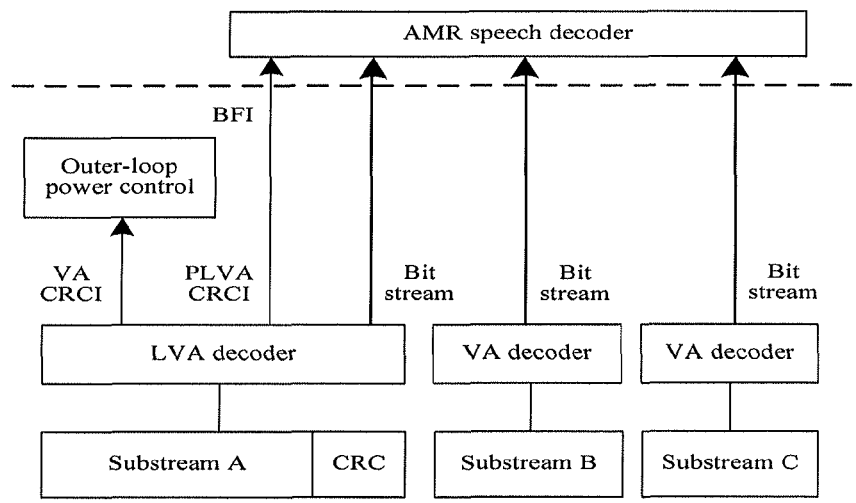
FIG. 23 is a schematic structural diagram of a user equipment in the method embodiment which is shown in FIG. 22.

FIG. 22 is a flow chart of an eighth method embodiment of speech signal processing according to the present invention. FIG. 23 is a schematic structure diagram of the UE described in the method embodiment shown in FIG. 22. As shown in FIG. 22 and FIG. 23, a method of this embodiment may include:

Step 251: Receive an encoded speech signal sent by a base station, where the encoded speech signal includes a first substream, a second substream, and a third substream, and the first substream includes a CRC;

Step 252: Perform decoding processing on the first substream by adopting a decoding algorithm that is based on a CRC auxiliary decision, to acquire decoding results on multiple candidate paths. The CRC is applied to perform CRC on the decoding results on the multiple candidate paths to acquire a decoding result on a path with a correct CRC result, a CRC result of the correct path, and a CRC result of the best path, where the best path is a maximum likelihood path which is determined by adopting a Viterbi decoding algorithm.

Step 253: Perform the outer-loop power control by adopting the CRC result of the best path.

Step 254: Perform decoding processing on an AMR speech signal according to the decoding result and the CRC result on the correct path, and the decoding result of the second substream and the third substream.

It should be noted that no sequence lies between step 253 and step 254.

Taking the struction of the PLVA decoder shown in FIG. 5 as an example, the PLVA decoder may include three outputs. The three outputs include the VA CRCI, the PLVA CRCI, and the PLVA decoding bit stream. The VA CRCI is the CRC result of the best path, where the best path is a preset path, for example, Path1, while the VA CRCI and the CRCI that is output by the VA decoder are equivalent. The PLVA CRCI is the CRC result of the correct path, and the correct path may be the same as the best path, for example, both the correct path and the best path are Path1, and at this time, the PLVA CRCI and the VA CRCI are the same. And the correct path may also be different from the best path, for example, the correct path is Path2, and then the PLVA CRCI is a check result of Path2, and the PLVA decoding bit stream is the decoding result of the correct path. If all paths in the candidate paths are incorrect, the CRC&Choose module of the PLVA decoder also outputs the CRC result of the best path, that also is, three outputs of the PLVA decoder are respectively the decoding result of the best path, the CRC result of the best path, and the CRC result of the best path, and at this time, the PLVA decoder is equivalent to the VA decoder.

It can be known from the foregoing description of the principle of the PLVA that, if the decoding result corresponding to the best path is correct, a result of VA decoding and a result of PLVA decoding are the same, and two CRC results are both correct; if the decoding result corresponding to the best path is wrong, and the decoding results which are corresponding to other candidate paths are correct, the VA CRC result is wrong, the PLVA CRC result is correct, and the PLVA outputs the correct decoding result; if the decoding results corresponding to all the candidate paths are wrong, the PLVA outputs the decoding result which is corresponding to the best path. Therefore, when the VA CRC result is correct, the CRC result of the PLVA is definitely correct. On the contrary, the PLVA CRC result is correct, but the VA CRC result is not necessarily correct.

In specific implementation, a receiving module in the UE may receive a downlink AMR speech signal including substream A, substream B and substream C, where the substream A includes a CRC. Two kind of decoders are included in the UE, one of which is a PLVA decoder and the other one of which is a VA decoder. The PLVA decoder may perform decoding on the substream A and the VA decoder may perform decoding on the substream B and substream C. The decoding processing on the substream B and substream C by adopting the VA decoder may adopt the technology in the prior art, which is not repeatedly described here again. The decoded bit streams may be sent to an AMR speech decoder in the UE for being decoded.

The decoding processing on the substream A by the PLVA decoder is described in the following. Regarding the substream A, three decoding result may be output by adopting the PLVA decoder shown in FIG. 5, which includes VA CRCI, PLVA CRCI and decoded bit streams. The PLVA CRCI and the decoded bit streams may be sent to the AMR speech decoder. The PLVA CRCI may be used for indicating whether a speech frame is available. The VA CRCI may be sent to an outer-loop power control module in the UE for performing an outer-loop power control. The NodeB can further perform framing on the PLVA decoded substream A, and substreams B and C obtained through the VA decoding, and send the framing result to the AMR Speech Decoder. In specific implementation, UE may perform framing on the PLVA decoded substream A, and substreams B and C obtained through the VA decoding, and send the framing result to the AMR speech decoder. The AMR speech decoder may perform speech decoding according to the AMR speech signal including three substreams and a corresponding BFI.

The inventor adopts the foregoing technical solution to perform system simulation, and it can be known from a simulation result that, for substream A of an AMR 12.2 k service, a PLVA-4, relative to the VA, has performance gain of about 0.3 dB. Through a solution that is reported by double-CRC, when BLER=1%, the gain of a MOS score of 0.1 can be obtained; when BLER=10%, the gain of the MOS score of 0.35 can be obtained. When the BLER in the system is larger, the gain which is of the MOS score and is brought by a PLVA is larger.

In this embodiment, by adopting a double-CRC solution, it is enabled that a speech processing system with power control, such as a WCDMA system, the performance gain brought by a LVA is directly converted into the gain of a speech MOS score. Because substream A is most important in the AMR speech, the method can improve the speech performance to the greatest extent and meanwhile has the smallest influence on the existing system.

Figure 24:
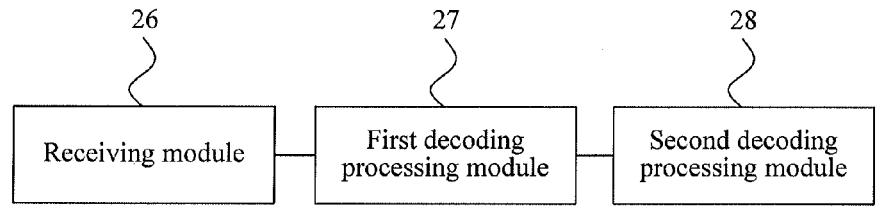
FIG. 24 is a schematic structural diagram of a first embodiment of a user equipment according to the present invention.

FIG. 24 is a schematic structural diagram of a first embodiment of a UE according to the present invention. As shown in FIG. 24, the UE in the embodiment may include: a receiving module 26, a first decoding processing module 27 and a second decoding processing module 28. The receiving module 26 is configured to receive an encoded speech signal sent by a base station, where the encoded speech signal includes a first substream, a second substream, and a third substream, and the first substream includes a CRC. The first decoding processing module 27 is configured to perform decoding processing on the first substream, the second substream, and the third substream by adopting a decoding algorithm, acquire decoding results of the first substream, the second substream, and the third substream, where a decoding algorithm that is based on an auxiliary decision of the CRC is adopted to perform decoding processing on the first substream and a decoded result of the first substream includes decoded bit stream and a CRC result. The second decoding processing module 28 is configured to perform decoding processing on an AMR speech signal according to the decoded bit stream and the CRC result of the first substream, decoded results of the second substream and the third substream.

In this embodiment, the receiving module 26 is a module in the UE, which is configured to receive a downlink signal sent by the base station. The first decoding processing module 27 is a module in the UE, which performs convolutional code decoding processing. The second decoding processing module 28 is an AMR speech decoder in the UE. The modules in the embodiment may be realized by adopting a hardware, such as reuse of a corresponding module in existing structures of the UE. The modules may also be realized by adopting a software, such as corresponding program codes stored in a storage, or by adopting a combination of software and hardware, such as, the first decoding processing module 27 and the second decoding processing module 28 may be implemented in software and the receiving module 26 may be implemented in a hardware.

The UE in the embodiment is configured to perform the technical scheme in the method embodiment as shown in FIG. 21, and has similar implementation principles and technical effects, which are not repeatedly described here again.

Figure 25:
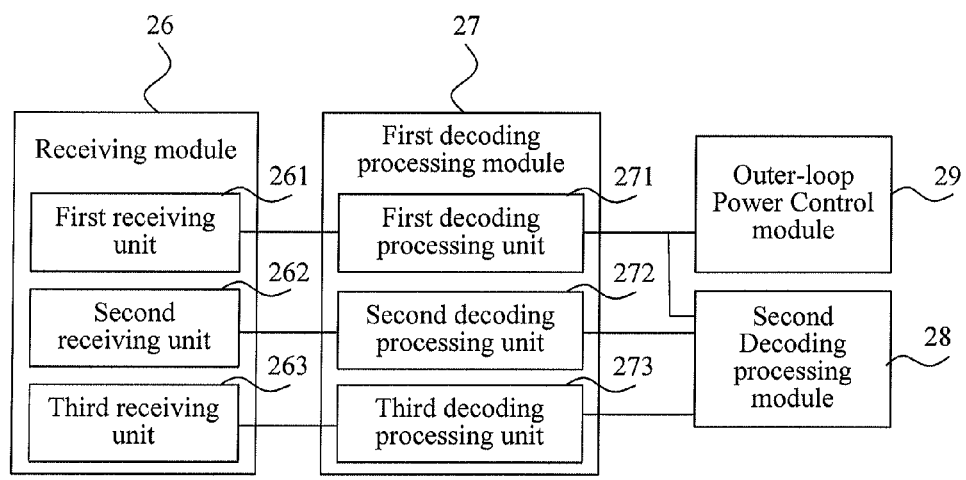
FIG. 25 is a schematic structural diagram of a second embodiment of a user equipment according to the present invention.

FIG. 25 is a schematic structural diagram of a second embodiment of a UE according to the present invention. As shown in FIG. 25, the UE in the embodiment is based on the structure of the UE as shown in FIG. 24 and may further include: an outer-loop power control module 29; and where:
 the receiving module 26 includes:
  a first receiving unit 261, configured to receive the first substream,
  a second receiving unit 262, configured to receive the second substream, and
  a third receiving unit 263, configured to receive the third substream;
 the first decoding processing module 27 includes:
  a first decoding processing unit 271, configured to perform decoding processing on the first substream by adopting a decoding algorithm that is based on a CRC auxiliary decision, to acquire decoding results on multiple candidate paths, to apply the CRC to perform CRC on the decoding results on the multiple candidate paths to acquire a decoding result on a path with a correct CRC result, a CRC result of the correct path, and a CRC result of the best path, where the best path is a maximum likelihood path which is determined by adopting a Viterbi decoding algorithm;
  a second decoding processing unit 272, configured to perform decoding processing on the second substream by adopting the Viterbi decoding algorithm, to acquire a decoding result; and
  a third decoding processing unit 273, configured to perform decoding processing on the third substream by adopting the Viterbi decoding algorithm, to acquire a decoding result;
 the outer-loop power control module 29 is configured to perform an outer-loop power control by adopting the CRC result of the best path; and
 the second decoding processing module 28 is configured to perform decoding processing on an AMR speech signal according to the decoding result and the CRC result on the correct path acquired by the first decoding processing unit 271, and the decoding result of the second substream acquired by the second decoding processing unit 272 and the decoding result of the third substream acquired by the third decoding processing unit 273.

It should be noted that in the embodiment, the three receiving unit may be one unit in physical structure, and the second decoding processing unit 272 and the third decoding processing unit 273 may be implemented by adopting one VA decoder.

The UE in the embodiment is configured to perform the technical scheme in the method embodiment as shown in FIG. 22, has a logical structure as shown in FIG. 23 and has similar implementation principles and technical effects, which are not repeatedly described here again.

Figure 26:
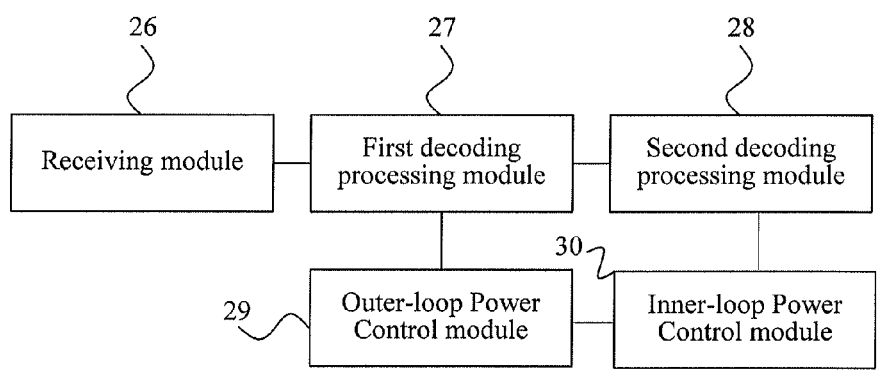
FIG. 26 is a schematic structural diagram of a third embodiment of a user equipment according to the present invention.

FIG. 26 is a schematic structural diagram of a third embodiment of a UE according to the present invention. As shown in FIG. 26, the UE in the embodiment is based on the structure of the UE as shown in FIG. 24 and may further include: an outer-loop power control module 29 and an inner-loop power control module 30.

The outer-loop power control module 29 is configured to reduce a target BLER of an outer-loop power control and to send a reduced target SINR to the inner-loop power control module according to the reduced target BLER.

The inner-loop power control module 30 is configured to perform an inner-loop power control according to the reduced target SINR and a measured SINR.

The UE in the embodiment may be configured to perform the foregoing solution 1 and has similar implementation principles and technical effects, which are not repeatedly described here again.

Figure 27:
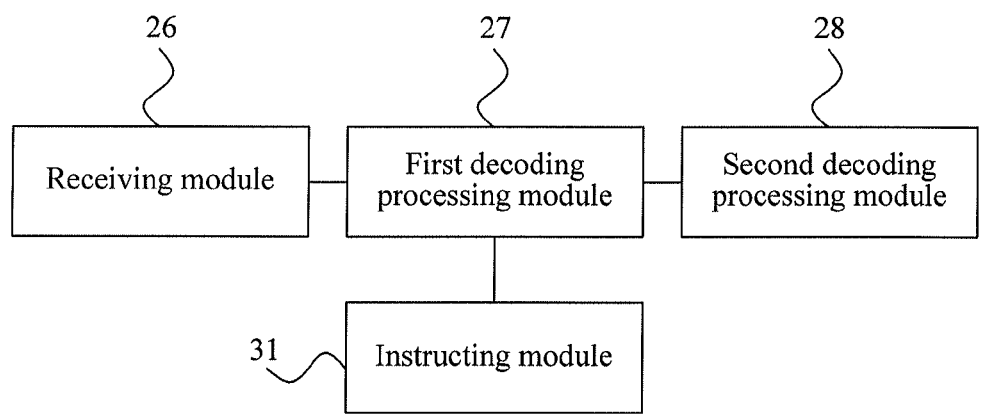
FIG. 27 is a schematic structural diagram of a fourth embodiment of a user equipment according to the present invention.

FIG. 27 is a schematic structural diagram of a fourth embodiment of a UE according to the present invention. As shown in FIG. 27, the UE in the embodiment is based on the structure of the UE as shown in FIG. 24 and may further include: an instructing module 31, configured to instruct that the base station reduces a channel resource occupied by the first substream and increases channel resources occupied by the second substream and the third substream.

The UE in the embodiment may be configured to perform the foregoing solution 2 and has similar implementation principles and technical effects, which are not repeatedly described here again.

Those of ordinary skill in the art may understand that all or a part of steps of the foregoing method embodiments may be accomplished by a program instructing relevant hardware, and the foregoing program may be stored in a computer readable storage medium. When the program runs, the steps of the foregoing method embodiments are executed, and the foregoing storage medium includes various mediums that can store program codes, such as a ROM, a RAM, a magnetic disk or a compact disk.

Finally, it should be noted that the foregoing embodiments are merely used to describe the technical solutions of the present invention, but not intended to limit the present invention. Although the present invention is described in detail with reference to the foregoing embodiments, persons of ordinary skill in the art should understand that modifications can still be made to the technical solutions recorded in each foregoing embodiment, or equivalent replacements can be made to some technical features in the technical solutions, while these modifications or replacements do not make the essence of corresponding technical solutions depart from the spirit and scope of the technical solutions of each embodiment of the present invention.

What is claimed is:
1. A method for processing speech signal, comprising:
 receiving an encoded speech signal sent by a base station, wherein the encoded speech signal comprises a first substream, a second substream, and a third substream, and the first substream is attached with a cyclic redundancy check (CRC);

performing decoding processing on the first substream, the second substream, and the third substream by adopting a decoding algorithm to acquire decoding results of the first substream, the second substream, and the third substream, wherein a decoding algorithm that is based on an auxiliary decision of the CRC is adopted to perform decoding processing on the first substream and a decoded result of the first substream comprises a decoded bit stream and a CRC result; and performing decoding processing on an adaptive muti-rate (AMR) speech signal according to the decoded bit stream and the CRC result of the first substream, decoded results of the second substream and the third substream; and reducing a target block error ratio of an outer-loop power control and performing an inner-loop power control according to a reduced target signal-noise ratio and a measured signal-noise ratio, wherein the reduced target signal-noise ratio is acquired according to the reduced target block error ratio.

2. The method according to claim 1, wherein the decoding algorithm that is based on the auxiliary decision of the CRC is a list Viterbi decoding algorithm or a bit inversion decoding algorithm.

3. The method according to claim 2, wherein the list Viterbi decoding algorithm is a parallel list Viterbi decoding algorithm or a serial list Viterbi decoding algorithm.

4. The method according to claim 3, wherein the parallel list Viterbi decoding algorithm is a parallel list Viterbi decoding algorithm which comprises 2, 4, 6, 8, 12 or 16 candidate paths.

5. The method according to claim 1, wherein the decoding algorithm that is based on the auxiliary decision of the CRC being adopted to perform decoding processing on the first substream comprises:

performing decoding processing on the first substream by adopting the decoding algorithm that is based on the auxiliary decision of the CRC, acquiring decoding results on multiple candidate paths, applying the CRC to perform CRC on the decoding results on the multiple candidate paths to acquire a decoding result on a path with a correct CRC result, a CRC result of the correct path, and a CRC result of the best path, wherein the best path is a maximum likelihood path which is determined by adopting a Viterbi decoding algorithm; and wherein after performing decoding processing on the first substream by adopting the decoding algorithm that is based on the auxiliary decision of the CRC, the method further comprises:

performing an outer-loop power control by adopting the CRC result of the best path, and wherein the performing decoding processing on an AMR speech signal according to the decoded bit stream and the CRC result of the first substream, decoded results of the second substream and the third substream comprises:

performing decoding processing on the AMR speech signal according to the decoding result and the CRC result on the correct path, and the decoding result of the second substream and the third substream.

6. The method according to claim 1, wherein after performing decoding processing on the first substream, the second substream, and the third substream by adopting a decoding algorithm, the method further comprises:

instructing that the base station reduces a channel resource occupied by the first substream and increases channel resources occupied by the second substream and the third substream.

7. A user equipment, comprising:

a receiving module, configured to receive an encoded speech signal sent by a base station, wherein the encoded speech signal comprises a first substream, a second substream, and a third substream, and the first substream is attached with a cyclic redundancy check (CRC);

a first decoding processing module, configured to perform decoding processing on the first substream, the second substream, and the third substream by adopting a decoding algorithm to acquire decoding results of the first substream, the second substream, and the third substream, wherein a decoding algorithm that is based on an auxiliary decision of the CRC is adopted to perform decoding processing on the first substream and a decoded result of the first substream comprises decoded bit stream and a CRC result;

a second decoding processing module, configured to perform decoding processing on an adaptive muti-rate (AMR) speech signal according to the decoded bit stream and the CRC result of the first substream, decoded results of the second substream and the third substream; and an outer-loop power control module, configured to reduce a target block error ratio of an outer-loop power control and to send a reduced target signal-noise ratio to the inner-loop power control module according to the reduced target block error ratio.

8. The user equipment according to claim 7, wherein the decoding algorithm that is based on the auxiliary decision of the CRC is a list Viterbi decoding algorithm or a bit inversion decoding algorithm.

9. The user equipment according to claim 8, wherein the list Viterbi decoding algorithm is a parallel list Viterbi decoding algorithm or a serial list Viterbi decoding algorithm.

10. The user equipment according to claim 9, wherein the parallel list Viterbi decoding algorithm is a parallel list Viterbi decoding algorithm which comprises 2, 4, 6, 8, 12 or 16 candidate paths.

11. The user equipment according to claim 7, further comprising an outer-loop power control module, wherein the receiving module comprises:
a first receiving unit, configured to receive the first substream,
a second receiving unit, configured to receive the second substream, and
a third receiving unit, configured to receive the third substream;

the first decoding processing module comprises:
a first decoding processing unit, configured to perform decoding processing on the first substream by adopting a decoding algorithm that is based on a CRC auxiliary decision, to acquire decoding results on multiple candidate paths, to apply the CRC to perform CRC on the decoding results on the multiple candidate paths to acquire a decoding result on a path with a correct CRC result, a CRC result of the correct path, and a CRC result of the best path, wherein the best path is a maximum likelihood path which is determined by adopting a Viterbi decoding algorithm;
a second decoding processing unit, configured to perform decoding processing on the second substream by adopting the Viterbi decoding algorithm, to acquire a decoding result; and a third decoding processing unit, configured to perform decoding processing on the third substream by adopting the Viterbi decoding algorithm, to acquire a decoding result;

the outer-loop power control module is configured to perform an outer-loop power control by adopting the CRC result of the best path; and the second decoding processing module is configured to perform decoding processing on an AMR speech signal according to the decoding result and the CRC result on the correct path acquired by the first decoding processing unit, and the decoding result of the second substream acquired by the second decoding processing unit and the decoding result of the third substream acquired by the third decoding processing unit.

12. The user equipment according to claim 7, further comprising: an inner-loop power control module, wherein the inner-loop power control module is configured to perform an inner-loop power control according to the reduced target signal-noise ratio and a measured signal-noise ratio.

13. The user equipment according to a claim 7, further comprising:

an instructing module, configured to instruct that the base station reduces a channel resource occupied by the first substream and increases channel resources occupied by the second substream and the third substream.

* * * * *